US011878516B2

(12) United States Patent
Hokari et al.

(10) Patent No.: US 11,878,516 B2
(45) Date of Patent: Jan. 23, 2024

(54) TAPE CASSETTE INCLUDING NIPPING MEMBER HAVING FIRST REGION, SECOND REGION, AND THIRD REGION FOR STABLY CONVEYING TAPE

(71) Applicant: BROTHER KOGYO KABUSHIKI KAISHA, Nagoya (JP)

(72) Inventors: Yuki Hokari, Nagoya (JP); Shota Iijima, Nagoya (JP); Masaya Fujita, Nagoya (JP); Satoru Ito, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/834,626

(22) Filed: Mar. 30, 2020

(65) Prior Publication Data

US 2020/0406647 A1 Dec. 31, 2020

(30) Foreign Application Priority Data

Jun. 28, 2019 (JP) ................................ 2019-120654

(51) Int. Cl.
*B41J 15/04* (2006.01)
*B41J 32/00* (2006.01)
*B41J 3/407* (2006.01)

(52) U.S. Cl.
CPC ............ *B41J 15/044* (2013.01); *B41J 32/00* (2013.01); *B41J 3/4075* (2013.01)

(58) Field of Classification Search
None
See application file for complete search history.

(56) References Cited

U.S. PATENT DOCUMENTS 5,685,654 A * 11/1997 Nagao .................... B41J 3/4075 400/248
2008/0310904 A1* 12/2008 Yamaguchi ............ B41J 3/4075 400/615.2

(Continued)

FOREIGN PATENT DOCUMENTS

CN 108778762 A * 11/2018 ............. B41J 11/70
EP 1 800 874 A1 6/2007

(Continued)

OTHER PUBLICATIONS

The extended European Search Report for the related European Patent Application No. 20167036.1 dated Dec. 10, 2020.

(Continued)

*Primary Examiner* — Matthew G Marini
(74) *Attorney, Agent, or Firm* — KENEALY VAIDYA LLP

(57) ABSTRACT

A tape cassette includes: a tape roll which is a roll of a tape wound about an axis extending in a first direction; and a nipping member configured to nip the tape conveyed in a second direction in cooperation with a conveying roller of a printing device. The nipping member includes: a first region configured to face one end portion of the tape; a second region configured to face another end portion of the tape; and a third region positioned between the first region and the second region. The first region and an imaginary reference surface provide a first length in a third direction. The second region and the imaginary reference surface provide a second length in the third direction. The third region and the imaginary reference surface provide a third length in the third direction. The third length is greater than the first length and the second length.

11 Claims, 17 Drawing Sheets

(56) References Cited

U.S. PATENT DOCUMENTS

| | | | | |
|---|---|---|---|---|
| 2010/0260528 | A1 | 10/2010 | Takahashi et al. | |
| 2011/0008090 | A1 | 1/2011 | Yamaguchi et al. | |
| 2011/0091595 | A1* | 4/2011 | Totani | B29C 55/06 425/367 |
| 2016/0200473 | A1* | 7/2016 | Nitta | B65H 27/00 492/27 |
| 2018/0326760 | A1* | 11/2018 | Sasaki | B65H 35/06 |
| 2019/0023038 | A1 | 1/2019 | Kodama et al. | |

FOREIGN PATENT DOCUMENTS

| | | | |
|---|---|---|---|
| EP | 2 338 687 | A1 | 6/2011 |
| JP | 2001-010732 | A | 1/2001 |
| JP | 2006-213010 | A | 8/2006 |
| JP | 2010-241089 | A | 10/2010 |
| JP | 2013-170023 | A | 9/2013 |
| JP | 2017-170834 | A | 9/2017 |
| WO | 2010/047154 | A1 | 4/2010 |

OTHER PUBLICATIONS

Japanese Office Action for the related Japanese Patent Application No. 2019-120654 dated Mar. 24, 2023.

* cited by examiner

TAPE CASSETTE INCLUDING NIPPING MEMBER HAVING FIRST REGION, SECOND REGION, AND THIRD REGION FOR STABLY CONVEYING TAPE

CROSS REFERENCE TO RELATED APPLICATION

This application claims priority from Japanese Patent Application No. 2019-120654 filed Jun. 28, 2019. The entire content of the priority application is incorporated herein by reference.

TECHNICAL FIELD

The present disclosure relates to a tape cassette attachable to a printer.

BACKGROUND

A tape cassette to be attached to a printer is well known in the art (for example, refer to Japanese Patent Application Publication No. 2017-170834). In this well-known technique, a tape cassette (a tape cartridge) is attachable to a cassette holder (a cartridge attachment portion) of a printer (a tape printing device). The tape cassette includes a tape roll which is a roll of a tape (a fabric tape) and a casing that accommodates the tape roll therein.

The printer includes a conveying roller (a movable conveying roller) configured to convey the tape. In a state where the tape cassette is attached to the cassette holder, the tape drawn out from the tape roll in the tape cassette is conveyed to a downstream side by a driving force of the conveying roller. The conveyed tape is heated by a thermal head of the printer, whereby characters are formed on the tape. Then, the tape is conveyed further to the downstream side while the tape is nipped at a portion between a nipping member (a tape drive roller) provided in the casing and the conveying roller, and is discharged to the outside of the casing.

SUMMARY

In this well-known technique, the tape fed from the tape cassette is nipped at the portion between the nipping member and the conveying roller as described above, and is conveyed further to the downstream side. Here, there is a likelihood that an axis of the conveying roller provided in the printer is slightly inclined relative to a surface of the tape because of, for example, an assembly error caused during a manufacturing process of the printer. In this case, the pressing force from the conveying roller fails to be applied uniformly on the tape that is nipped and conveyed as described above, whereby a pressure applied to the tape varies in a widthwise direction of the tape. Consequently, a force for conveying the tape becomes ununiformly to hinder a stable conveyance of the tape, thereby making it difficult to restrict occurrence of a jam during the conveyance of the tape.

In view of the foregoing, it is an object of the present disclosure to provide a tape cassette in which a tape can be stably conveyed even when an axis of a conveying roller provided in a printer is inclined because of an assembly error.

In order to attain the above and other objects, according to one aspect, the disclosure provides a tape cassette for use with a printing device. The printing device includes a conveying roller and a cassette holder to which the tape cassette is attachable. The tape cassette includes: a tape roll; a case; and a nipping member. The tape roll is a roll of a tape wound about an axis extending in a first direction. The tape has one end portion and another end portion in the first direction. The tape is configured to be conveyed by the conveying roller. The case accommodates the tape roll therein. The nipping member is provided in the case. The nipping member is configured to nip the tape drawn out from the tape roll and conveyed in a second direction in cooperation with the conveying roller in a state where the tape cassette is attached to the cassette holder. The second direction is perpendicular to the first direction. The nipping member includes: a first region; a second region; and at least one third region. The first region is configured to face the one end portion in the first direction of the tape. The first region and an imaginary reference surface provide a first length in a third direction therebetween. The third direction is perpendicular to both the first direction and the second direction. The second region is configured to face the another end portion in the first direction of the tape. The second region and the imaginary reference surface provide a second length in the third direction therebetween. The at least one third region positioned between the first region and the second region in the first direction. The at least one third region and the imaginary reference surface provide a third length in the third direction therebetween. The third length is greater than both the first length and the second length.

According to another aspect, the disclosure provides a tape cassette for use with a printing device. The printing device includes a conveying roller and a cassette holder to which the tape cassette is attachable. The tape cassette includes: a tape roll; a case; and a nipping member. The tape roll is a roll of a tape wound about an axis extending in a first direction. The tape has one end portion and another end portion in the first direction. The tape is configured to be conveyed by the conveying roller. The case accommodates the tape roll therein. The nipping member is provided in the case. The nipping member is configured to nip the tape drawn out from the tape roll and conveyed in a second direction in cooperation with the conveying roller in a state where the tape cassette is attached to the cassette holder. The second direction is perpendicular to the first direction. The nipping member includes: a first region; a second region; and at least one third region. The first region is configured to face the one end portion in the first direction of the tape. The second region is configured to face the another end portion in the first direction of the tape. The at least one third region is positioned between the first region and the second region in the first direction. The at least one third region is configured to exclusively make contact with the tape.

According to still another aspect, the disclosure provides a tape cassette for use with a printing device. The printing device includes a conveying roller and a cassette holder to which the tape cassette is attachable. The tape cassette includes: a tape roll; a case; and a nipping member. The tape roll is a roll of a tape wound about an axis extending in a first direction. The tape has one end portion and another end portion in the first direction. The tape is configured to be conveyed by the conveying roller. The case accommodates the tape roll therein. The nipping member is provided in the case. The nipping member is configured to nip the tape drawn out from the tape roll and conveyed in a second direction in cooperation with the conveying roller in a state where the tape cassette is attached to the cassette holder. The second direction is perpendicular to the first direction. The nipping member is configured to make contact with a portion of the tape other than the one end portion and the another end portion in the first direction of the tape.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Figure 1:
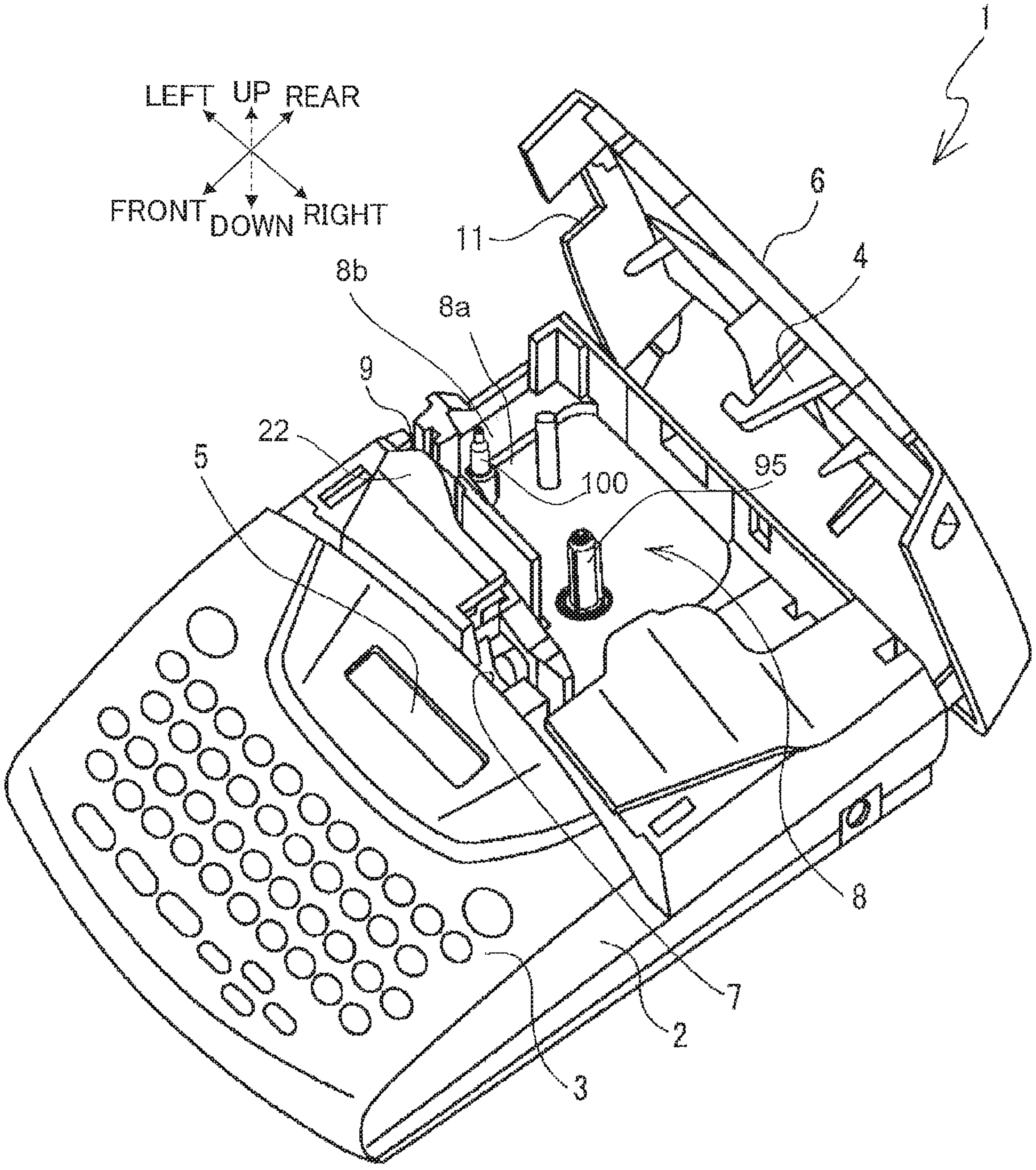
FIG. 1 is a perspective view of a tape printing device to which a tape cartridge according to one embodiment of the present disclosure is attachable, and illustrating a state where a cover of the tape printing device is in its open position.

Hereinafter, one embodiment of the present disclosure will be described while referring to the accompanying drawings. In the following description, the lower-left side in FIG. 1 is defined as the front side, the upper-right side in FIG. 1 is defined as the rear side, the lower-right side in FIG. 1 is defined as the right side, and the upper-left side of FIG. 1 is defined as the left side (refer to the arrows illustrated in the drawings). Further, parts and components illustrated in the drawings may be depicted in which a scale is varied as appropriate in order to facilitate understanding of the present disclosure.

<Overall Configuration of Tape Printing Device>

First, an overall configuration of a tape printing device to which a tape cartridge according to the present embodiment is attachable will be described. As illustrated in FIG. 1, a tape printing device 1 according to the present embodiment includes a main cover 2 on which a keyboard 3 is provided. A liquid-crystal display 5 is provided rearward of the keyboard 3, and a cover 6 movable between an open position and a closed position is provided rearward of the liquid-crystal display 5. Within the main cover 2, a recessed cartridge attachment portion 8 is provided. A tape cartridge 30 (see FIG. 2) is attachable to and detachable from the cartridge attachment portion 8.

A discharge slit 9 is provided in a rear portion of a left surface of the main cover 2. A printed fabric tape 153 (described later) is configured to be discharged outside of the main cover 2 through the discharge slit 9. A discharge window 11 is provided on a left surface of the cover 6, and a locking latch 4 is provided at a substantially center portion of a front surface of the cover 6. When the cover 6 is in the closed position, the locking latch 4 is fitted into and engaged with a latch hole 7 provided in the main cover 2.

<Internal Configuration of Main Cover>

Figure 2:
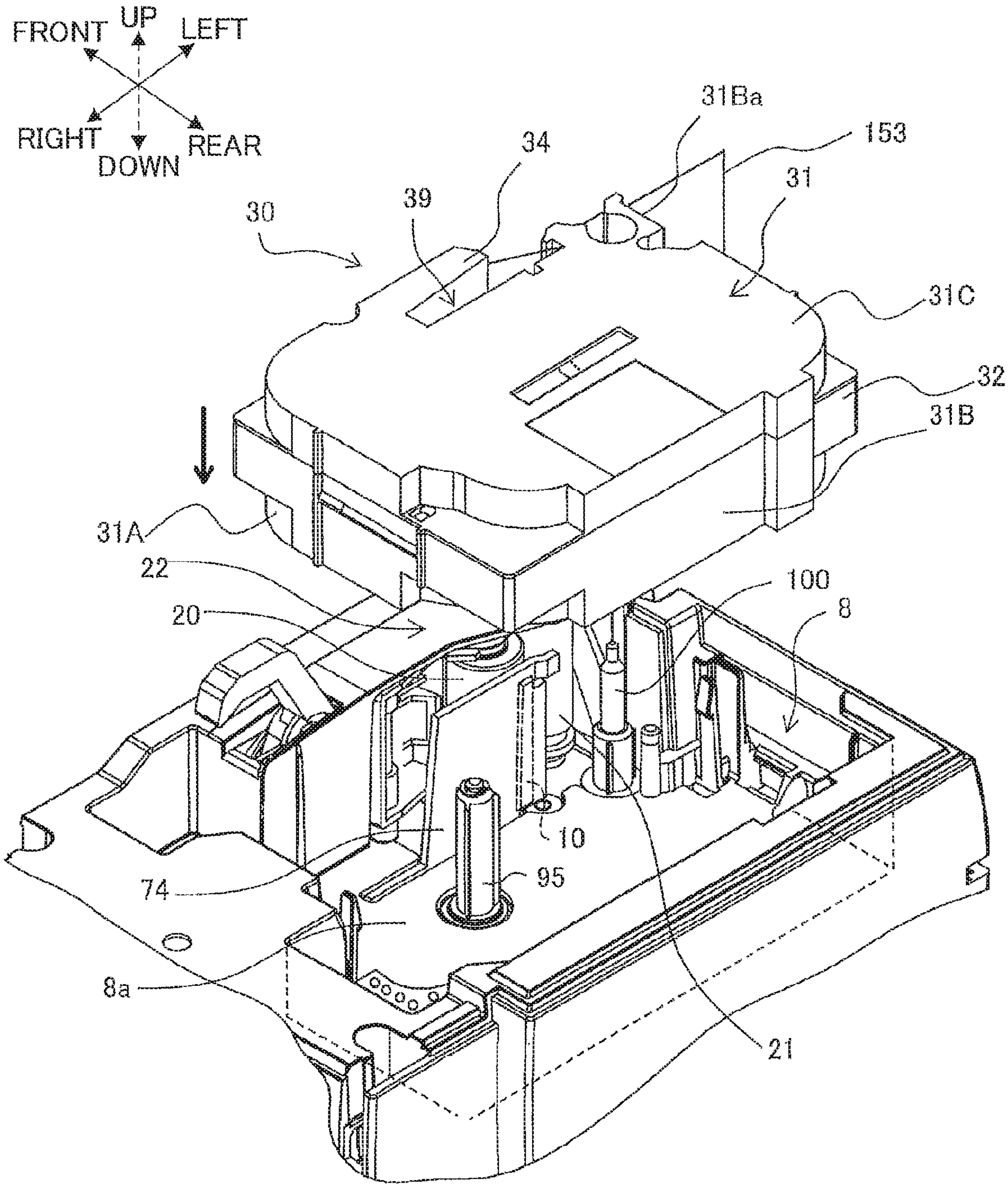
FIG. 2 is a perspective view of the tape cartridge according to the embodiment and a cartridge attachment portion in the tape printing device to which the tape cartridge is to be attached.
Figure 3:
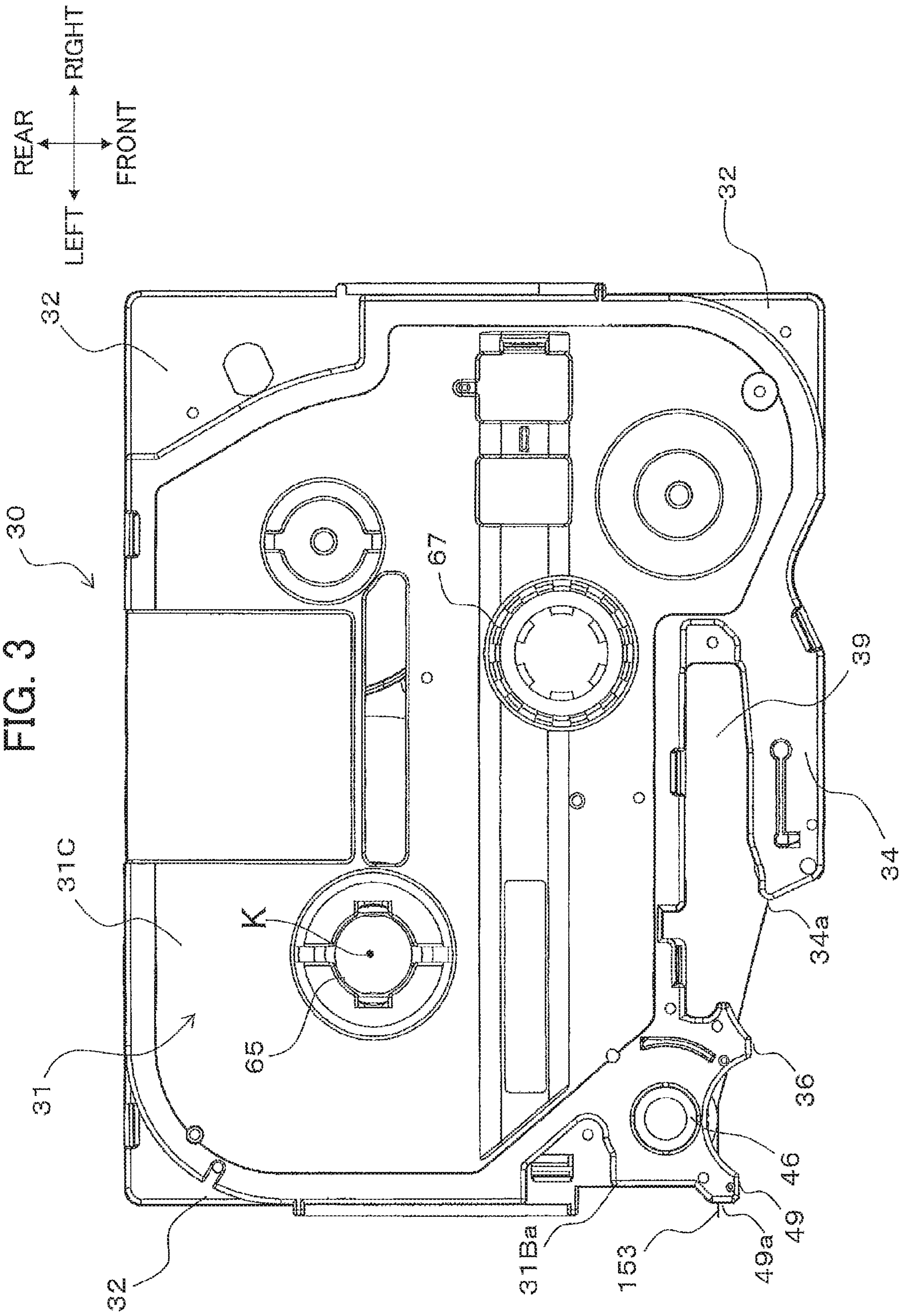
FIG. 3 is a plan view of the tape cartridge according to the embodiment.
Figure 4A:
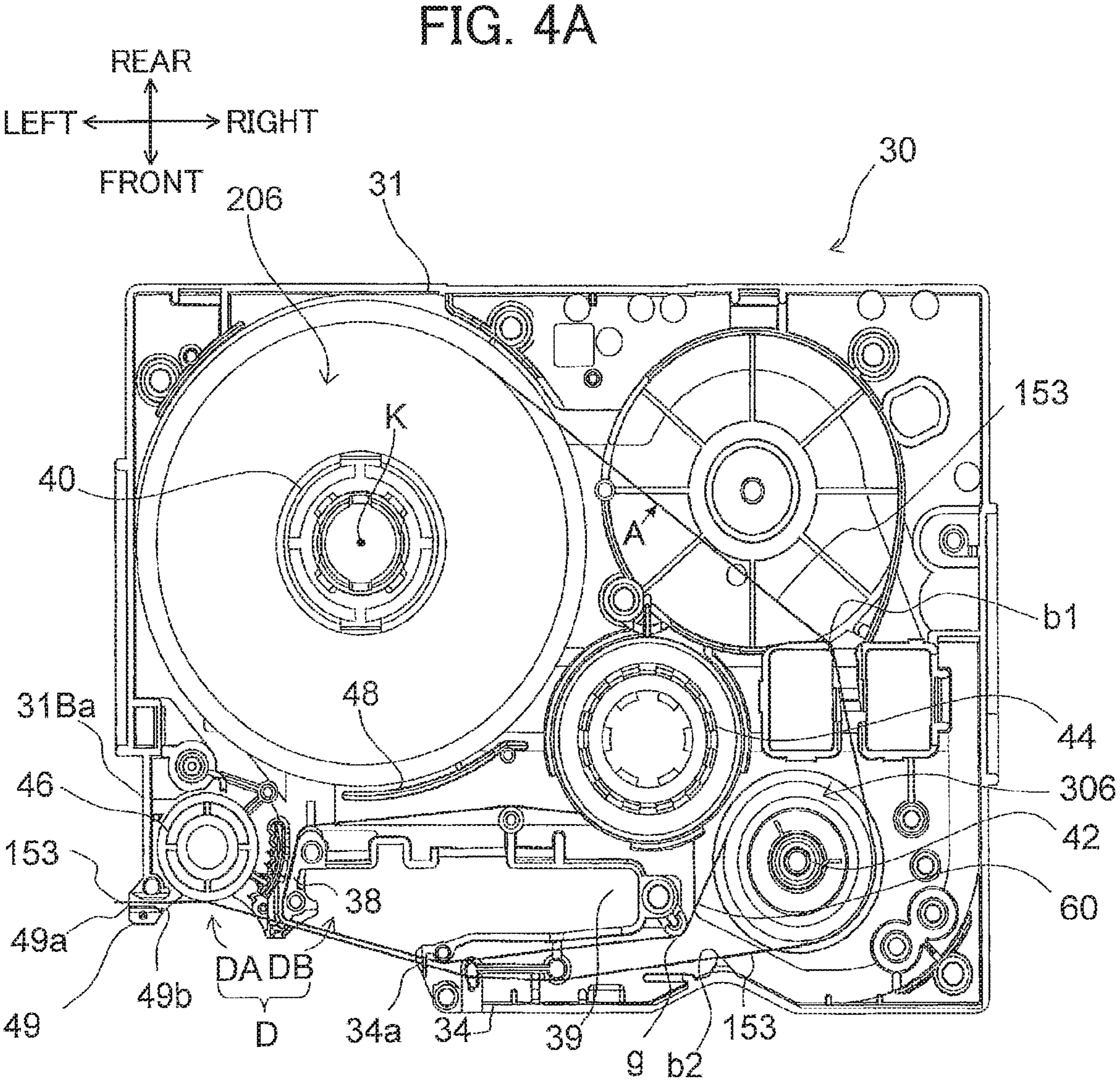
FIG. 4A is a plan view illustrating an internal configuration of the tape cartridge according to the embodiment in which a top surface thereof is omitted.
Figure 4B:
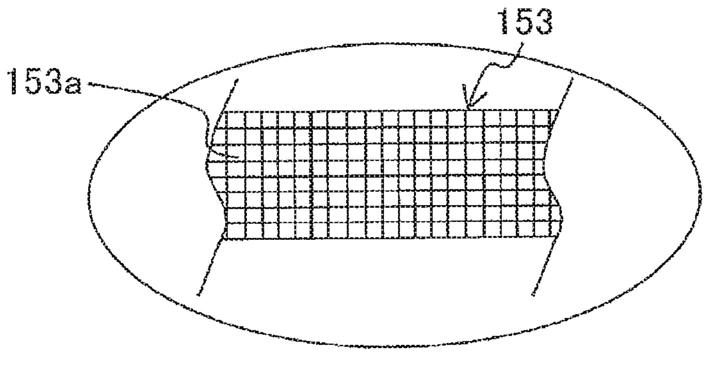
FIG. 4B is a perspective view of a fabric tape in the tape cartridge according to the embodiment as viewed from a direction indicated by an arrow A in FIG. 4A.

Next, an internal configuration of the main cover 2 will be described with reference to FIGS. 2 to 4. As illustrated in FIGS. 2 to 4, the cartridge attachment portion 8 is configured to support the tape cartridge 30 from a lower side thereof. The tape cartridge 30 includes a cartridge casing 31 having a bottom surface 31A. The tape cartridge 30 is configured to be inserted into the cartridge attachment portion 8 with the bottom surface 31A facing the cartridge attachment portion 8, and is attached to the cartridge attachment portion 8.

The cartridge casing 31 of the tape cartridge 30 is in a form of a substantially box-shape, and has a top surface 31C, the bottom surface 31A, and a side surfaces 31B. The top surface 31C and the bottom surface 31A constitute an upper end and a lower end of the cartridge casing 31, respectively. The side surfaces 31B constitute ends of the cartridge casing 31 in a horizontal direction perpendicular to an up-down direction, and has a specific side surface 31Ba.

A tape discharge opening 49*a* is provided on the specific side surface 31Ba which serves a most downstream end of a conveyance path of the printed fabric tape 153. The printed fabric tape 153 (described later) is conveyed such that a widthwise direction of the fabric tape 153 is parallel to the up-down direction, and is configured to be discharged to the outside of the cartridge casing 31 through the tape discharge opening 49*a*.

A tape spool 40 is disposed in a rear-left portion of the cartridge casing 31. The tape spool 40 is rotatably supported by a support hole 65 (see FIG. 3). The fabric tape 153 made of a fabric material is wound about the tape spool 40. The fabric tape 153 is wound about the tape spool 40 to constitute a tape roll 206. The tape roll 206 has an axis K (i.e., an axis of the tape spool 40) extending in the up-down direction. The up-down direction is a direction perpendicular to the paper in FIGS. 4A and 4B.

A ribbon spool 42 is rotatably disposed in a front-right portion of the cartridge casing 31. An ink ribbon 60 is wound about the ribbon spool 42 to constitute a ribbon roll 306.

A ribbon take-up spool 44 is disposed between the tape spool 40 and the ribbon spool 42 within the cartridge casing 31. The ribbon take-up spool 44 is rotatably supported by a support hole 67 (see FIG. 3). The ribbon take-up spool 44 is configured to pull out the ink ribbon 60 from the ribbon spool 42 and to take up the ink ribbon 60 used for printing characters.

An arm portion 34 is provided in a front-right portion of the tape cartridge 30. The arm portion 34 slightly extends frontward of the tape cartridge 30 and is bent leftward toward the center portion of the tape cartridge 30 at a right angle. The fabric tape 153 drawn out from the tape roll 206 and conveyed along bending portions b1 and b2 (see FIG. 4A) and the ink ribbon 60 drawn out from the ribbon roll 306 and conveyed along a guide roller g are guided into the arm portion 34.

A space defined by a rear surface of the arm portion 34 and a front surface of the cartridge casing 31 serves as a head attachment portion 39. The head attachment portion 39 is configured to receive a head holder 74 on which a thermal head 10 (see FIG. 2) of the tape printing device 1 is mounted in a state where the tape cartridge 30 is attached to the cartridge attachment portion 8. A tape guiding portion 34*a* is provided at a distal end of the arm portion 34 so as to face the head attachment portion 39. The tape guiding portion 34*a* is configured to guide the fabric tape 153 and the ink ribbon 60 to the head attachment portion 39 while the fabric tape 153 and the ink ribbon 60 are placed close to each other (or superposed on each other, see FIG. 4A).

In the conveying direction in which the fabric tape 153 and the ink ribbon 60 are conveyed from the tape guiding portion 34*a* of the arm portion 34 to the tape discharge opening 49*a*, a support hole is provided at a portion downstream of the head attachment portion 39. A tape drive roller 46 is rotatably supported inside this support hole. The tape drive roller 46 is configured to oppose a movable conveying roller 21 provided in the cartridge attachment portion 8.

Figure 6A:
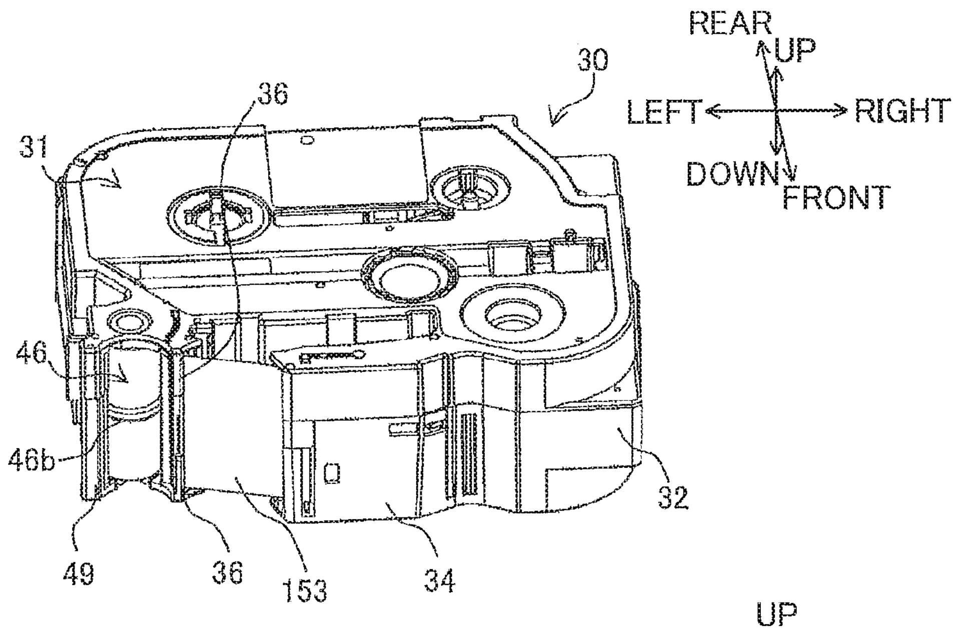
FIG. 6A is a perspective view illustrating a detailed external configuration of the tape cartridge according to the embodiment as viewed from the front side thereof.
Figure 6B:
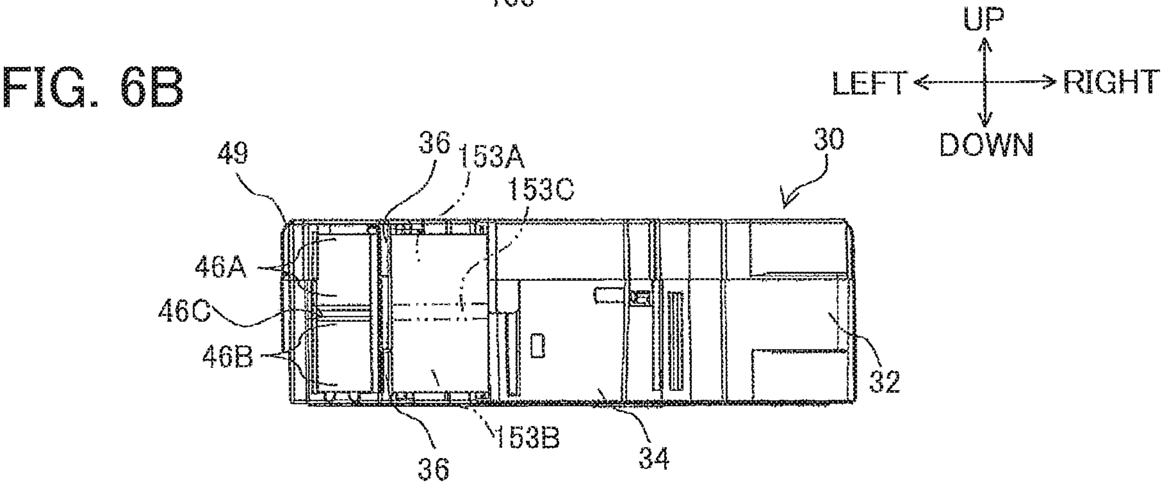
FIG. 6B is a side view illustrating the detailed external configuration of the tape cartridge according to the embodiment.
Figure 6C:
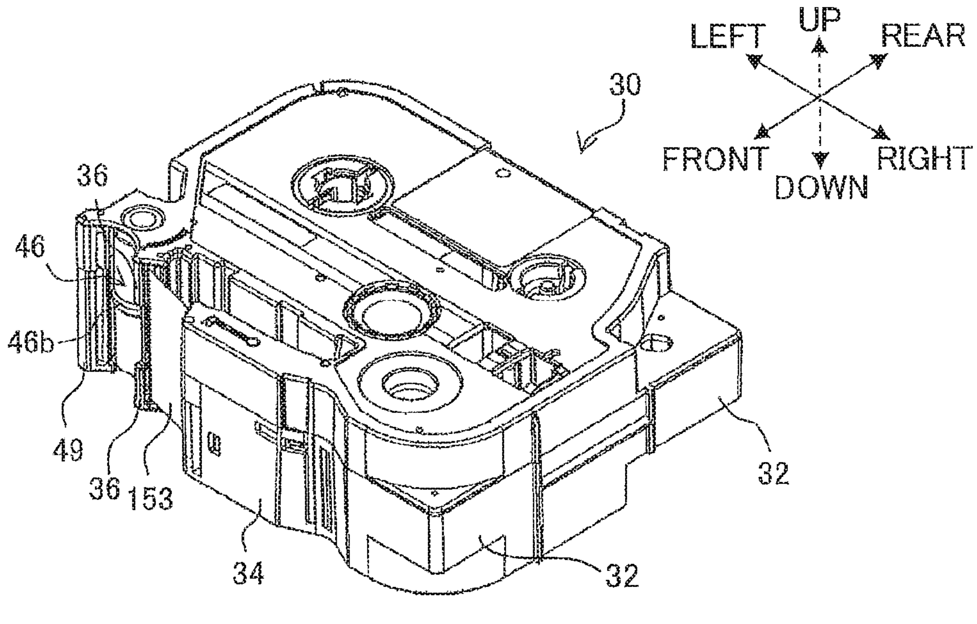
FIG. 6C is a perspective view illustrating the detailed external configuration of the tape cartridge according to the embodiment as viewed from the front-right side thereof.
Figure 13A:
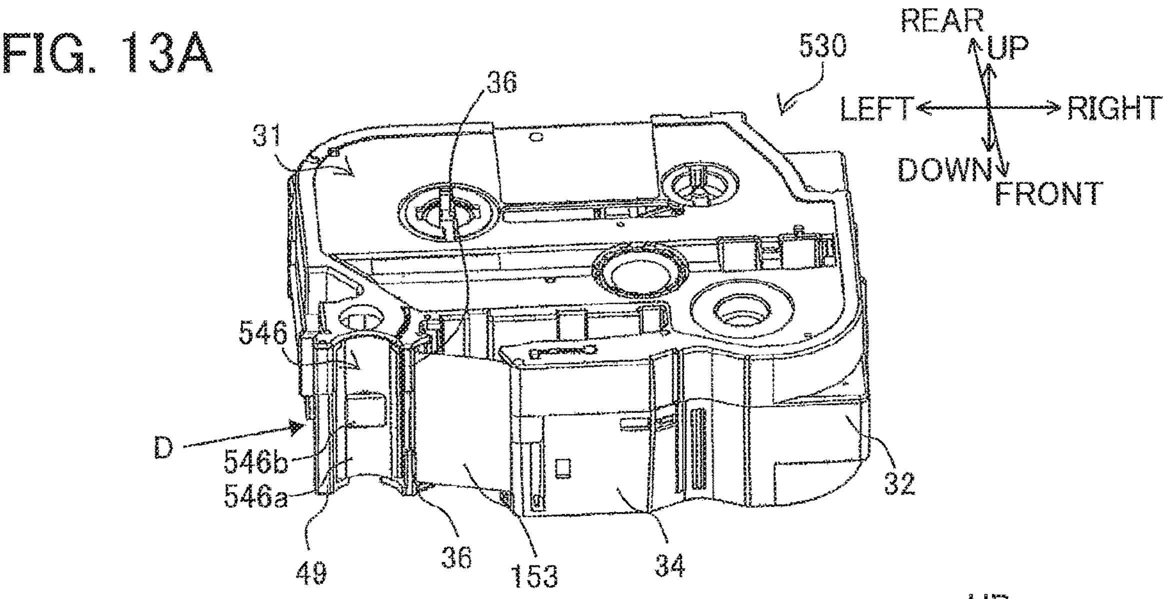
FIG. 13A is a perspective view illustrating a detailed external configuration of a tape cartridge according to a fifth modification as viewed from the front side thereof in which a tape nipping plate is employed as a nipping member instead of a tape drive roller.

In cooperation with the movable conveying roller 21, the tape drive roller 46 is configured to nip the fabric tape 153 conveyed in a left-right direction and draw out the fabric tape 153 from the tape spool 40 to convey the same. In other words, the tape drive roller 46 is provided at a position between the tape discharge opening 49*a* and an insertion recess portion DB (described later). For clearly illustrating the configuration of components, in FIGS. 6A to 6C, illustration of the fabric tape 153 at a position downward of (leftward of) a pair of regulating members 36 in the conveying direction is omitted. The same is true with respect to FIGS. 13A to 13C etc. (described later).

The pair of upper and lower regulating members 36 (see FIG. 3) is provided upstream of the tape drive roller 46 in the conveying direction. The pair of regulating members 36 is configured to allow the fabric tape 153 on which characters have been printed by the downstream side of the thermal head 10 to be conveyed therethrough and to regulate the displacement of the fabric tape 153 in its widthwise direction in order to guide the fabric tape 153 toward the tape discharge opening 49*a*. The regulating members 36 are provided such that end portions of the regulating members 36 facing the fabric tape 153 passing therethrough do not interfere with a third region 46C (described later) of the tape drive roller 46.

A guide wall 38 is provided in the vicinity of the regulating members 36. The guide wall 38 is configured to separate the used ink ribbon 60 conveyed through the head attachment portion 39 from the fabric tape 153 and to guide the used ink ribbon 60 toward the ribbon take-up spool 44. A separation wall 48 is provided at a position between the guide wall 38 and the ribbon take-up spool 44. The separation wall 48 is configured to prevent the used ink ribbon 60 guided along the guide wall 38 from contacting the fabric tape 153 wound about the tape spool 40.

The tape cartridge 30 includes a contact-process recess portion D provided upstream of the tape discharge opening 49*a* in the conveyance path of the fabric tape 153. This contact-process recess portion D provides a processing space for conveying and printing characters on the fabric tape 153. Specifically, the contact-process recess portion D includes an abutment recess portion DA and the insertion recess portion DB. In the abutment recess portion DA, the movable conveying roller 21 abuts against the tape drive roller 46 to convey the fabric tape 153. The insertion recess portion DB is provided at a position upstream of the abutment recess portion DA, and the thermal head 10 is to be inserted into the insertion recess portion DB.

The tape cartridge 30 also includes a tape insertion portion 49. The tape discharge opening 49*a* is provided downstream of the tape insertion portion 49 in the conveyance path, and a tape introduction opening 49*b* configured to face the abutment recess portion DA is provided upstream of the tape insertion portion 49 in the conveyance path. With this configuration, the tape insertion portion 49 allows the fabric tape 153 to be introduced thereinto through the tape introduction opening 49*b* and allows the fabric tape 153 to pass through the tape discharge opening 49*a*.

Meanwhile, the tape guiding portion 34*a* is provided at a portion where the arm portion 34 faces the insertion recess portion DB. The tape guiding portion 34*a* is configured to guide the fabric tape 153 drawn out from the tape roll 206 and the ink ribbon 60 drawn out from the ribbon roll 306 to the insertion recess portion DB and expose the fabric tape 153 and the ink ribbon 60 to the outside of the cartridge casing 31.

As illustrated in FIGS. 2 and 3, the cartridge casing 31 includes common portions 32 constituting prescribed corner portions of the cartridge casing 31. Specifically, the common portions 32 are provided at corner portions excluding a corner where the tape discharge opening 49*a* is provided. Each of the common portions 32 is provided at a center portion in a height direction of the corner portion and protrudes outward so as to define a right angle as viewed in a plan view.

In the meantime, the cartridge attachment portion 8 includes a recessed portion 8*a* having a substantially rectangular shape with rounded corners as viewed in a plan view, as illustrated in FIGS. 1 and 2. Of upper edges of the recessed portion 8*a*, a flat surface adjacent to the rounded corners serves as a cartridge support portion 8*b*. The cartridge support portion 8*b* is configured to support the common portions 32 of the tape cartridge 30 attached to the cartridge attachment portion 8 from the lower side thereof. In other words, in the state where the tape cartridge 30 is attached to the cartridge attachment portion 8, the common portions 32 are supported by the cartridge support portion 8*b* from their lower sides.

A dimensional relationship between the common portions 32 and the cartridge support portion 8*b* is set in advance so that a center portion of a heat-generating portion of the thermal head 10 substantially coincides with the center portion in the widthwise direction of the fabric tape 153 fed and conveyed from the tape cartridge 30.

Here, a plurality of types of tape cartridges 30 respectively accommodating therein fabric tapes 153 having widths different from one another has been prepared. Any types of these tape cartridges 30 can be attached to the cartridge attachment portion 8. In this case, the dimensions of the common portions 32 of each tape cartridge 30 and configurations in the vicinity thereof are set in advance so that, whichever type of the tape cartridge 30 is attached to the cartridge attachment portion 8, the center portion of the heat-generating portion of the thermal head 10 substantially coincides with the center portion in the widthwise direction of the fabric tape 153.

<Detailed Configuration of Cartridge Attachment Portion>

As illustrated in FIG. 2, the head holder 74, a ribbon take-up shaft 95, and a tape drive shaft 100 are provided at the cartridge attachment portion 8. The thermal head 10 including a heat-generating body (not illustrated) is mounted on the head holder 74. A well-known tape feeding motor (not illustrated) is disposed outside the cartridge attachment portion 8. A drive shaft of the tape feeding motor is drivingly connected to the ribbon take-up shaft 95 and the tape drive shaft 100 (see FIG. 2) via a gear mechanism (not illustrated) constituted by a plurality of gears.

In the state where the tape cartridge 30 is attached to the cartridge attachment portion 8, the ribbon take-up shaft 95 is inserted into the ribbon take-up spool 44 provided in the tape cartridge 30 and drivingly rotates the ribbon take-up spool 44; and the tape drive shaft 100 is inserted into the tape drive roller 46 provided in the tape cartridge 30 and drivingly rotates the tape drive roller 46.

The cartridge attachment portion 8 also includes a roller holder 22, as illustrated in FIGS. 1 and 2. The roller holder 22 is supported by a support shaft (not illustrated) so as to be pivotally movable, by operating an appropriate switching mechanism, a between a printing position and a release position. A platen roller 20 and the movable conveying roller 21 are rotatably provided in the roller holder 22. Specifically, the platen roller 20 and the movable conveying roller 21 are in a cantilever configuration on a drive shaft (not illustrated) provided on a lower portion of the roller holder 22. When the roller holder 22 is switched into the printing position (a position illustrated in FIG. 2), the platen roller 20 and the movable conveying roller 21 are pressed against the thermal head 10 and the tape drive roller 46, respectively.

A cutter mechanism (not illustrated) is provided in a conveyance path between the tape discharge opening 49*a* of the tape cartridge 30 and the discharge slit 9, that is, in the conveyance path through which the fabric tape 153 is conveyed. The cutter mechanism is configured to cut the printed fabric tape 153 at a predetermined position to provide a printed tape.

<Satin-Weave Configuration of Fabric Tape>

Figure 5A:
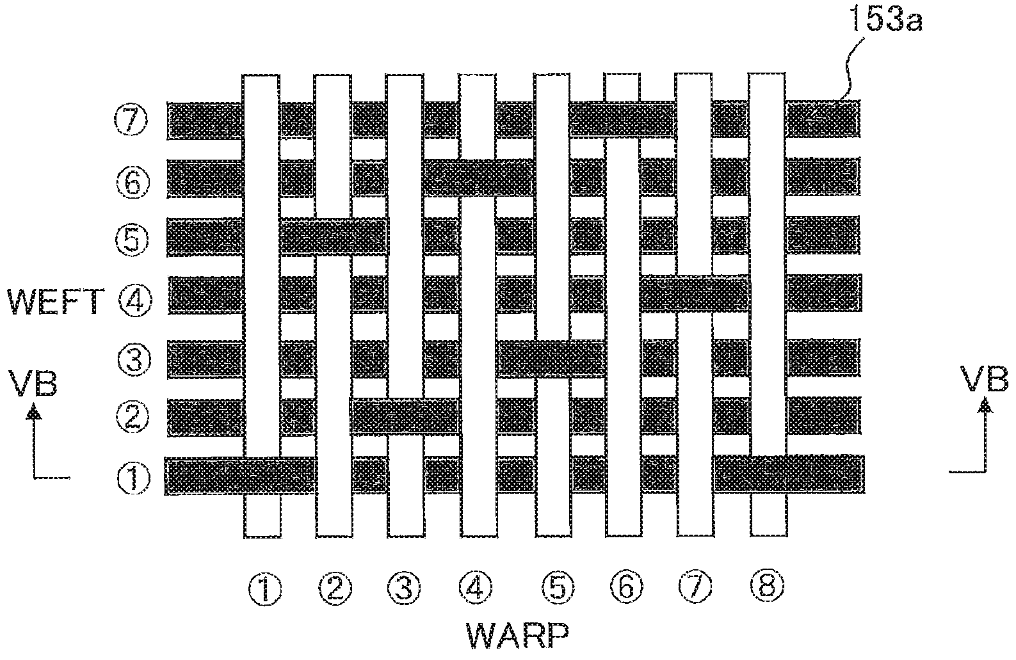
FIG. 5A is a schematic top view illustrating a portion of a printed surface of the fabric tape in the tape cartridge according to the embodiment.
Figure 5B:
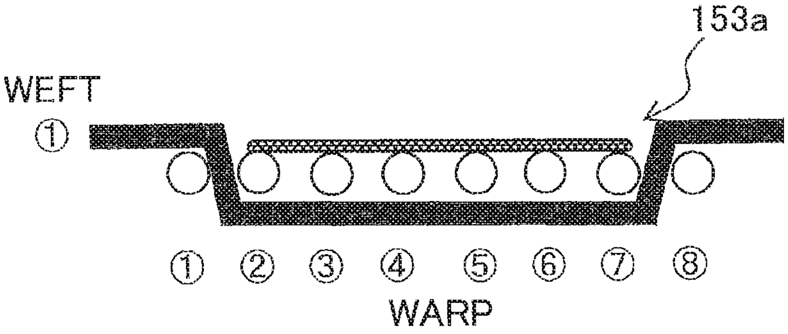
FIG. 5B is a schematic lateral cross-sectional view taken along a line VB-VB in FIG. 5A.

The fabric tape 153 will be described next. FIGS. 5A and 5B schematically illustrate a detailed configuration of satin-weave of the fabric tape 153 according to the present embodiment. FIG. 5A is a schematic top view illustrating a portion of a printed surface 153*a* of the fabric tape 153, and FIG. 5B is a schematic lateral cross-sectional view taken along a line VB-VB in FIG. 5A.

The fabric tape 153 is formed by weaving warp yarns (hereinafter also simply referred to as "warp") extending in a longitudinal direction of the tape and weft yarns (hereinafter also simply referred to as "weft") extending in the widthwise direction of the tape). In this example, the fabric tape 153 is of satin-weave of the warp yarns and the weft yarns with more warp yarns being exposed on a top surface of the fabric tape 153. That is, more warp yarns are exposed than the weft yarns in one of the two surfaces of the fabric tape 153 in a thickness direction thereof, and the one surface of the medium serves as the printed surface 153*a* (see FIG. 4B).

As illustrated in FIGS. 5A and 5B, the fabric tape 153 according to the present embodiment is of so-called 7-harness satin weave. In the region of the printed surface 153*a* illustrated in FIG. 5A, for example, eight warp yarns (1) to (8) and seven weft yarns (1) to (7) are interwoven. In the fabric tape 153 according to the present embodiment, the printed surface 153*a* is subjected to a well-known calendar process for the purpose of improving the printing quality. In the tape roll 206 to be used, the fabric tape 153 is wound about the tape spool 40 so that the printed surface 153*a* faces inward.

<Operation of Tape Printing Device>

In the configuration described above, after the tape cartridge 30 has been attached to the cartridge attachment portion 8, the ribbon take-up shaft 95 and the tape drive shaft 100 are drivingly rotated in synchronization with each other by a driving force of the tape feeding motor. As the tape drive shaft 100 is driven, the tape drive roller 46, the platen roller 20, and the movable conveying roller 21 are rotated, and the fabric tape 153 is drawn out from the tape roll 206 and conveyed as described above.

At the same time, a plurality of heat-generating elements provided in the heat-generating body of the thermal head 10 is driven to generate heat, and the ink ribbon 60 is pressed by the thermal head 10 to come into contact with the printed surface 153*a* of the fabric tape 153. Consequently, desired characters are printed on the printed surface 153*a*. Then, the printed fabric tape 153 is conveyed to a cutting position of the cutter mechanism to be cut by the cutter mechanism, and the cut fabric tape 153 is conveyed to the outside of the tape cartridge 30 through the tape discharge opening 49*a*.

<Prominent Features in Present Embodiment>

In the basic configuration and the operation according to the present embodiment described above, the most prominent feature lies in the configuration of the tape drive roller 46 provided in the tape cartridge 30. The detailed description will be made in sequence below.

<Possible Inclination of Tape Drive Roller>

As described above, in the tape printing device 1 according to the present embodiment, the fabric tape 153 fed from the tape cartridge 30 is nipped at the portion between the tape drive roller 46 and the movable conveying roller 21, and conveyed further to the downstream side. Here, the axis of the movable conveying roller 21 provided in the roller holder 22 of the tape printing device 1 may be slightly inclined relative to the printed surface 153*a* of the fabric tape 153 because of, for example, an assembly error caused during the manufacture process of the tape printing device 1.

In that case, the pressing force by the movable conveying roller 21 fails to be applied uniformly on the fabric tape 153 nipped and conveyed as described above, thereby causing a pressure applied to the fabric tape 153 to vary in the widthwise direction thereof. Consequently, the conveyance force of the fabric tape 153 becomes non-uniform, and the fabric tape 153 fails to be conveyed stably. Thus, it is difficult to prevent an occurrence of a conveyance stoppage (i.e., a so-called jam) in the tape printing device 1.

<Protruding Portion provided in Tape Drive Roller>

In order to address the above possible problem, a protruding portion is provided on an outer peripheral portion of the tape drive roller 46 in the present embodiment. Specifically, the tape drive roller 46 includes a roller body 46*a* having a hollow cylindrical shape centered on a rotation axis k, and a protruding portion 46*b* provided on an outer peripheral surface of the roller body 46*a*. In this example, only one protruding portion 46*b* is provided at a center portion in the axial direction of the rotation axis k (i.e., in the up-down direction) of the roller body 46*a*.

With this configuration, three regions, i.e., a first region 46A, a second region 46B, and the third region 46C are defined in the tape drive roller 46. That is, in the tape drive roller 46, the first region 46A is a region defined upward of the protruding portion 46*b*, the second region 46B is a region defined downward of the protruding portion 46*b*, and the third region 46C is a region containing the protruding portion 46*b*.

The first region 46A is configured to face an upper end portion 153A of the fabric tape 153. The second region 46B is configured to face a lower end portion 153B of the fabric tape 153. The third region 46C is a region defined between the first region 46A and the second region 46B in the up-down direction. The third region 46C is configured to face a center portion 153C between the upper end portion 153A and the lower end portion 153B of the fabric tape 153.

Figure 7A:
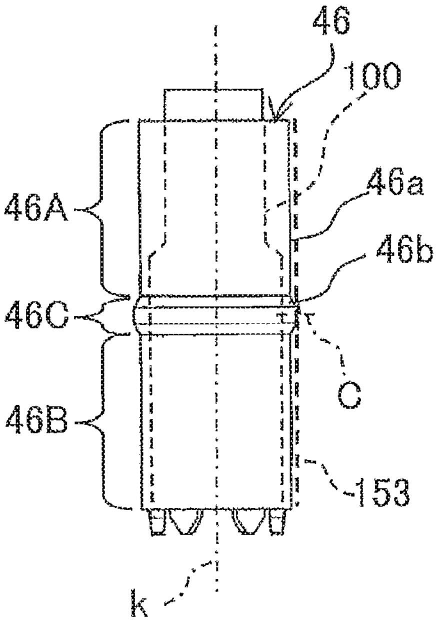
FIG. 7A is a side view illustrating a detailed external configuration of a tape drive roller in the tape cartridge according to the embodiment.
Figure 7B:
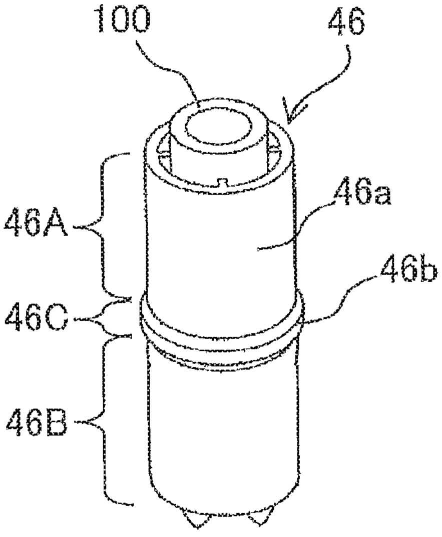
FIG. 7B is a perspective view illustrating the detailed external configuration of the tape drive roller in the tape cartridge according to the embodiment.
Figure 7C:
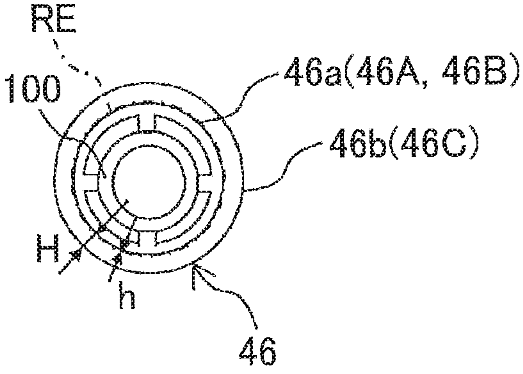
FIG. 7C is a top view illustrating the detailed external configuration of the tape drive roller in the tape cartridge according to the embodiment.

As illustrated in FIG. 7C, since the protruding portion 46*b* protrudes from the roller body 46*a*, the third region 46C provides a length H in a radial direction between a prescribed reference surface RE and an outer peripheral surface of the protruding portion 46*b*. In the meantime, each of the first region 46A and the second region 46B provides a length h in the radial direction between the reference surface RE and the outer peripheral surface of the roller body 46*a*. The length H is greater than length h. In this example, the outer peripheral surface of the roller body 46*a* serves as the reference surface RE. Accordingly, the length h described above is approximately equal to zero.

Figure 8:
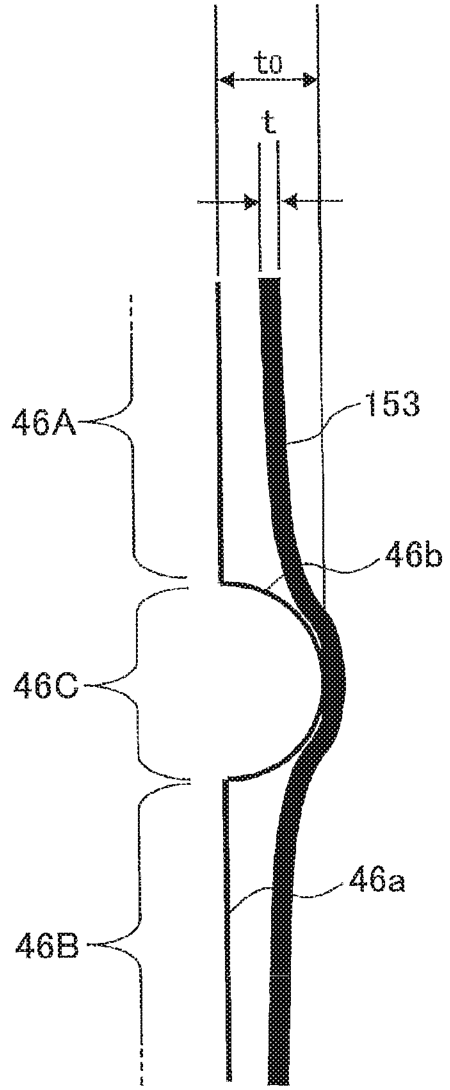
FIG. 8 is an explanatory view for explaining a state where the fabric tape is in contact with a protruding portion of the tape drive roller in the tape cartridge according to the embodiment.

In addition, owing to the configuration in which the third region 46C protrudes further radially outward than the first region 46A and the second region 46B, only the third region 46C of the tape drive roller 46 makes contact with the fabric tape 153. Particularly, the third region 46C makes contact with at least a center C of the fabric tape 153 in the up-down direction (in the widthwise direction of the tape). Further, as illustrated in FIG. 8, a dimension to of the third region 46C in the radial direction (i.e., a thickness direction of the tape) is greater than a dimension t of the fabric tape 153 in the radial direction (i.e., the thickness direction of the tape). That is, the first region 46A and the second region 46B do not make contact with the upper end portion 153A and the lower end portion 153B of the fabric tape 153, respectively.

Advantageous Effects of the Embodiment

As described above, according to the present embodiment, in the tape drive roller 46 serving as an example of a nipping member, the length H in the radial direction of the third region 46C (i.e., the length in the radial direction between the reference surface RE and the outer peripheral surface of the protruding portion 46*b*) is greater than the length h in the radial direction of the first region 46A and the second region 46B (i.e., the length in the radial direction between the reference surface RE and the outer peripheral surface of the roller body 46*a*). That is, the third region 46C protrudes further radially outward than the first region 46A and the second region 46B.

With the above configuration, when the fabric tape 153 is nipped at the portion between the tape drive roller 46 and the movable conveying roller 21 provided in the tape printing device 1, the third region 46C of the tape drive roller 46 particularly makes intense contact with the fabric tape 153 instead of a configuration where the entire portion of tape drive roller 46 makes intense contact with the fabric tape 153 uniformly.

In this manner, as a limited region of the tape drive roller 46 makes intense contact with the fabric tape 153, even if the axis of the movable conveying roller 21 provided in the tape printing device 1 is slightly inclined relative to the surface of the fabric tape 153 because of an assembly error and the like, a variation in pressure applied to the nipped fabric tape 153 with respect to the widthwise direction thereof can be reduced. Consequently, the conveying force of the fabric tape 153 can be restricted from becoming non-uniform to attain the stable conveyance of the fabric tape 153, thereby preventing occurrence of a conveyance stoppage (i.e., a jam of the tape).

Further, particularly in the present embodiment, the dimension to in the radial direction of the third region 46C in the tape drive roller 46 is greater than the dimension t in the radial direction of the fabric tape 153. This configuration can more reliably restrict the fabric tape 153 from making contact with a portion of the tape drive roller 46 other than the third region 46C, i.e., the first region 46A and the second region 46B.

In the present embodiment, particularly, when the fabric tape 153 is nipped at the portion between the tape drive roller 46 and the movable conveying roller 21 of the tape printing device 1, only the third region 46C makes contact with the fabric tape 153, instead of the entire portion of the tape drive roller 46 making contact with the fabric tape 153. As a limited region of the tape drive roller 46 makes contact with the fabric tape 153 in this way, the variation in the pressure described above can be reduced, and the conveying force of the fabric tape 153 can be restricted from being non-uniform. Thus, the conveyance stoppage can be kept from occurring.

Further, in particular in the present embodiment, in a state where the fabric tape 153 is nipped between the tape drive roller 46 and the movable conveying roller 21, the upper end portion 153A and the lower end portion 153B do not make contact with the first region 46A and the second region 46B, respectively, and only the center portion 153C between the upper end portion 153A and the lower end portion 153B makes contact with the third region 46C of the tape drive roller 46. Thus, of the tape cartridge 30, only the third region 46C of the tape drive roller 46 in the tape cartridge 30 makes contact with the fabric tape 153. This configuration can reduce the occurrence of any variation in the pressure that could be produced in the widthwise direction of the fabric tape 153.

Particularly in the present embodiment, the third region 46C of the tape drive roller 46 makes contact with at least the center C of the fabric tape 153 in the widthwise direction thereof. By the third region 46C of the tape drive roller 46 making contact with a region of the fabric tape 153 including the center C thereof in the widthwise direction in this way, any pressure variation that could be occurred in the widthwise direction of the fabric tape 153 can be reduced.

Further, particularly in the present embodiment, the tape drive roller 46 serving as an example of a nipping member and rotatably supported by the cartridge casing 31 is provided. Owing to this the above configuration, the tape drive roller 46 can nip the fabric tape 153 in cooperation with the movable conveying roller 21 to convey the fabric tape 153 smoothly to the downstream side in the conveying direction.

Further, in the present embodiment, in particular, the tape drive roller 46 is provided at the portion between the tape discharge opening 49*a* and the insertion recess portion DB. Accordingly, during the conveyance of the fabric tape 153 accommodated within the cartridge casing 31 along the insertion recess portion DB, the tape drive roller 46 and the tape discharge opening 49*a* in this order, the tape drive roller 46 can reliably nip the fabric tape 153 in cooperation with the movable conveying roller 21 and convey the same.

Further, in particular in the present embodiment, the fabric tape 153 is employed as a tape, and this makes significances described below. Specifically, since fabric has a less rigidity and can be stretched easily, the fabric tape 153 is likely to be deformed or be warped when conveyed. According to the present embodiment, even with the tape cartridge 30 that includes the fabric tape 153 having such characteristics, the configuration described above can reduce any pressure variation that could occur in the widthwise direction of the tape, and an oblique movement of the fabric tape 153 can be suppressed.

Further, in the present embodiment, the movable conveying roller 21 is in a cantilever configuration on the drive shaft provided on the lower portion of the roller holder 22. This makes the following significance. Specifically, when the movable conveying roller 21 is supported in a cantilever configuration on the drive shaft, an inclination of the axis caused by an assembly error described above is likely in particular to occur. According to the present embodiment, even in a case where the tape cartridge 30 is attached to the tape printing device 1 having such characteristics, the configuration described above can reduce any pressure variation that could occur in the widthwise direction of the fabric tape 153, and the skew of the fabric tape 153 can be suppressed.

Modifications to the Embodiment

While the description has been made in detail with reference to the embodiment, it would be apparent to those skilled in the art that the present disclosure is not limited to the above-described embodiment and various modifications and variations may be made thereto. Hereinafter, various modifications will be described in sequence. In the modifications, like parts and components are designated with the same reference numerals as those shown in the above-described embodiment to omit or simplify the description as appropriate.

<(1) Case where a Plurality of Protruding Portions is Provided>

Figure 9A:
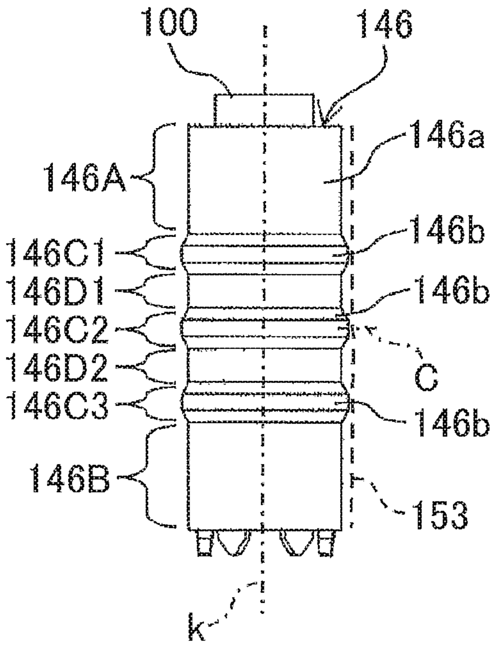
FIG. 9A is a side view illustrating a detailed external configuration of a tape drive roller in a tape cartridge according to a first modification to the embodiment in which tape drive roller is provided with a plurality of protruding portions.
Figure 9B:
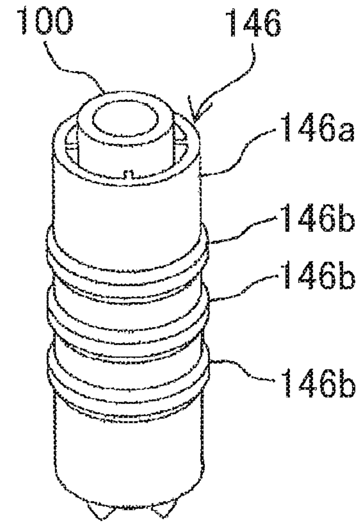
FIG. 9B is a perspective view illustrating the detailed external configuration of the tape drive roller in the tape cartridge according to the first modification.
Figure 9C:
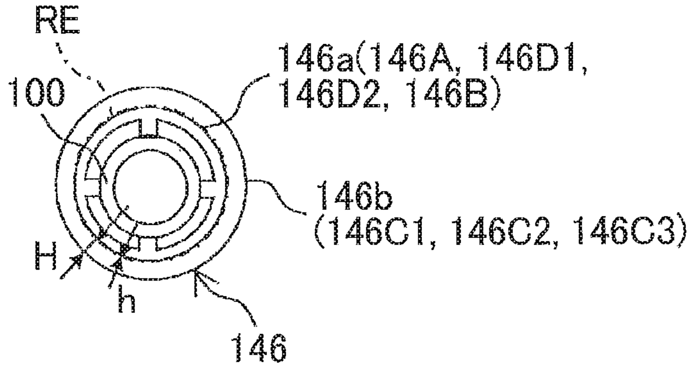
FIG. 9C is a top view illustrating the detailed external configuration of the tape drive roller in the tape cartridge according to the first modification.

In a first modification to the above-described embodiment, a tape drive roller 146 provided with a plurality of protruding portions is employed instead of the tape drive roller 46. Specifically, in the first modification, the tape drive roller 146 includes a roller body 146*a* and a plurality of portions 146*b* as illustrated in FIGS. 9A to 9C. One protruding portion 146*b* is provided at each of a center portion, a portion above the center portion, and a portion below the center portion in the axial direction of the rotation axis k (in the up-down direction) on an outer peripheral surface of the roller body 146a. Accordingly, a total of three protruding portions 146b are provided. With the above configuration, four regions, i.e., a first region 146A, a second region 146B, third regions 146C1 to 146C3, and fourth regions 146D1 and 146D2 are defined in the tape drive roller 146.

As in the above-described embodiment, the first region 146A is configured to oppose the upper end portion of the fabric tape 153, and the second region 146B is configured to oppose the lower end portion of the fabric tape 153. The third regions 146C1 to 146C3 and the fourth regions 146D1 and 146D2 are regions positioned between the first region 146A and the second region 146B in the up-down direction. The third regions 146C1 to 146C3 and the fourth regions 146D1 and 146D2 are configured to oppose an intermediate portion between the upper end portion and the lower end portion of the fabric tape 153.

The three protruding portions 146b described above define the plurality of (three in this example) third regions 146C1 to 146C3. Specifically, the third region 146C2 corresponds to the protruding portion 146b that is provided at a center in the up-down direction of the three protruding portions 146b. A region corresponding to the protruding portion 146b positioned higher than the protruding portion 146b at the center is the third region 146C1. A region corresponding to the protruding portion 146b positioned lower than the protruding portion 146b at the center is the third region 146C3. A region between the third region 146C1 and the third region 146C2 is the fourth region 146D1. A region between the third region 146C2 and the third region 146C3 is the fourth region 146D2.

As similar to the above-described embodiment, as illustrated in FIG. 9C, each of the third regions 146C1 to 146C3 provides a length H in the radial direction between the prescribed reference surface RE and the outer peripheral surface of each protruding portion 146b. Meanwhile, each of the first region 146A, the second region 146B, and the fourth regions 146D1 and 146D2 provides a length h in the radial direction between the reference surface RE and the outer peripheral surface of the outer peripheral surface of the roller body 146a. The length H is greater than the length h.

Further, as in the above-described embodiment, only the third regions 146C1, 146C2, and 146C3 of the tape drive roller 146 make contact with the fabric tape 153, and in particular, the third region 146C2 makes contact with at least the center C of the fabric tape 153 in the up-down direction (i.e., the widthwise direction of the tape). Although not illustrated in the drawings, a dimension of the third regions 146C1, 146C2, and 146C3 in the radial direction (i.e., the thickness direction of the tape) is greater than a dimension of the fabric tape 153 in the radial direction (i.e., the thickness direction of the tape). In the state where the fabric tape 153 is nipped between the tape drive roller 146 and the movable conveying roller 21, the first region 146A, the second region 146B, and the fourth regions 146D1 and 146D2 do not make contact with the fabric tape 153, and the upper end portion and the lower end portion of the fabric tape 153 do not make contact with any portion of the tape drive roller 146.

The first modification provides advantageous effects similar to those of the above-described embodiment. In particular, when the fabric tape 153 is nipped between the tape drive roller 146 and the movable conveying roller 21 of the tape printing device 1, only the third regions 146C1, 146C2, and 146C3 make contact with the fabric tape 153, instead of the entire portion of the tape drive roller 146 making contact with the fabric tape 153. In this way, since a limited region of the tape drive roller 146 contacts the fabric tape 153, the pressure variation described above can be reduced and the conveying force can be prevented from becoming non-uniform, thereby restricting the occurrence of a conveyance stoppage (jam in the tape printing device).

In this first modification, in particular, the tape drive roller 146 is provided with the plurality of (three in this example) third regions 146C1, 146C2, and 146C3. With this configuration, the tape drive roller 146 makes contact with the fabric tape 153 with a plurality of (three in this example) portions, i.e., the plurality of third regions 146C1, 146C2, and 14603 such that the pressing force applied to the fabric tape 153 is distributed. Accordingly, a pressure variation in the widthwise direction of the tape can be suppressed.

<(2) Case where a Protruding Portion is Positioned Offset Downward from Center Portion in Widthwise Direction of Tape>

Figure 10A:
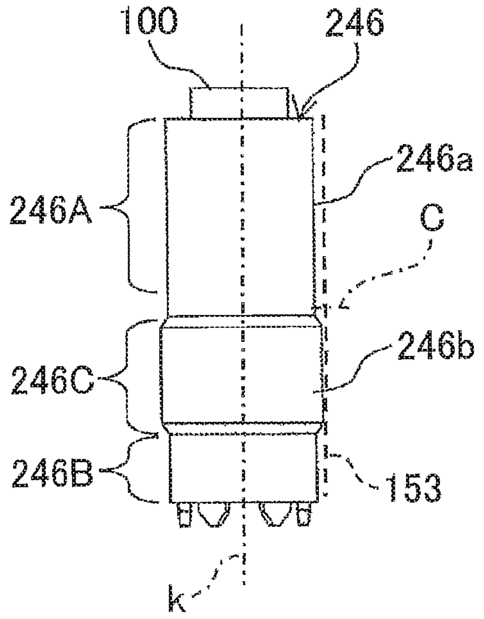
FIG. 10A is a side view illustrating a detailed external configuration of a tape drive roller in a tape cartridge according to a second modification to the embodiment in which the tape drive roller is provided with a protruding portion provided at a position offset downward from a vertical center portion of the fabric tape.
Figure 10B:
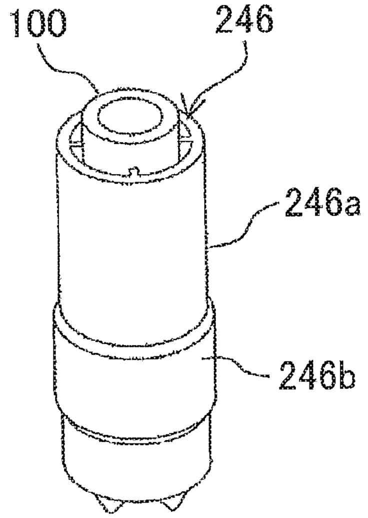
FIG. 10B is a perspective view illustrating the detailed external configuration of the tape drive roller in the tape cartridge according to the second modification.
Figure 10C:
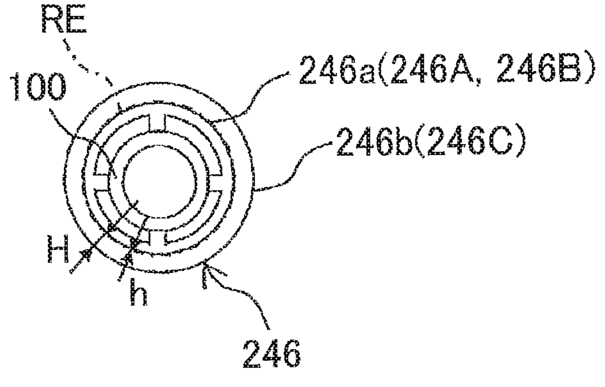
FIG. 10C is a top view illustrating the detailed external configuration of the tape drive roller in the tape cartridge according to the second modification.

In a second modification, as in the above-described embodiment, a tape drive roller 246 is provided with only one protruding portion 246b provided on an outer peripheral surface of a roller body 246a. In this example, however, as illustrated in FIGS. 10A to 10C, the protruding portion 246b is provided at a position that is slightly offset downward from the center portion in the axial direction of the rotation axis k (i.e., the up-down direction) of the tape drive roller 246. As in the above-described embodiment, with this configuration, three regions including a first region 246A, a second region 246B, and a third region 246C are defined in the tape drive roller 246.

As in the above-described embodiment, the first region 246A is configured to face the upper end portion of the fabric tape 153. In the second modification, however, the first region 246A is configured to oppose a region of the fabric tape 153 positioned below the upper end portion (i.e., a region in the vicinity of the center portion in the up-down direction of the fabric tape 153). The second region 246B is configured to oppose the lower end portion of the fabric tape 153.

The third region 246C is a region located between the first region 246A and the second region 246B in the up-down direction. The third region 246C is configured to oppose the intermediate portion between the upper end portion and the lower end portion of the fabric tape 153. In this case, however, the third region 246C does not make contact with the center C in the widthwise direction of the fabric tape 153, but makes contact with a region offset from the center C in the widthwise direction of the fabric tape 153.

As in the above-described embodiment, as illustrated in FIG. 10C, the third region 246C provides a length H in the radial direction between the prescribed reference surface RE and the outer circumferential surface of the protruding portion 246b that is greater than a length h of each of the first region 246A and the second region 246B in the radial direction between the reference surface RE and the outer circumferential surface of the roller body 246a.

In addition, as in the above-described embodiment, only the third region 246C of the tape drive roller 246 makes contact with the fabric tape 153. Furthermore, although not illustrated in the drawings, a dimension in the radial direction (i.e., the thickness direction of the tape) of the third region 246C is greater than a dimension in the radial direction (i.e., the thickness direction of the tape) of the fabric tape 153. With this configuration, the first region 246A and the second region 246B do not make contact with the upper end portion and the lower end portion of the fabric tape 153, respectively.

According to the second modification, advantageous effects similar to that of the above-described embodiment can be exhibited.

<(3) Case where Roller Body has a Barrel Shape>

Figure 11A:
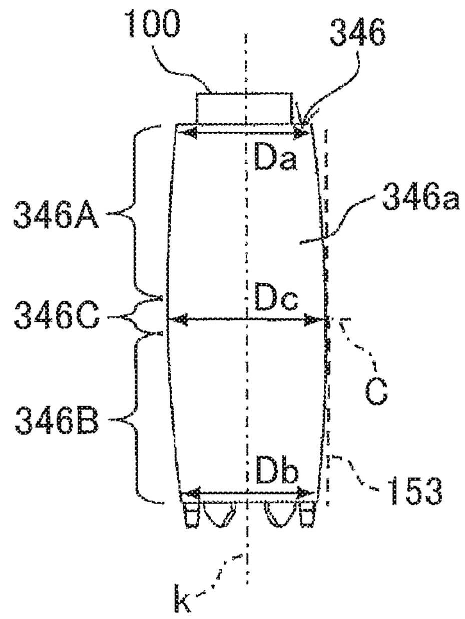
FIG. 11A is a side view illustrating a detailed external configuration of a tape drive roller in a tape cartridge according to a third modification to the embodiment in which a roller body of the tape drive roller has a barrel-like shape.
Figure 11B:
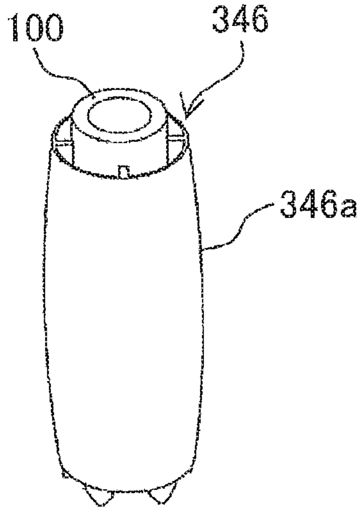
FIG. 11B is a perspective view illustrating the detailed external configuration of the tape drive roller in the tape cartridge according to the third modification.

In this third modification, no protruding portion such as those in the above-described embodiment and the first and second modifications is provided on a roller body 346*a* of a tape drive roller 346. Instead, and the roller body 346*a* itself has a barrel shape. Specifically, as illustrated in FIGS. 11A to 11C, the roller body 346*a* has a beer barrel-like shape in which a diameter Da at one end portion (i.e., an upper end portion in FIG. 11A) in the axial direction of the rotation axis k (i.e., the up-down direction) and a diameter db at another end portion (i.e., a lower end portion in FIG. 11A) are smaller than a diameter Dc at a center portion in the axial direction of the roller body 346*a*.

In this case as well, as in the above-described embodiment, three regions, i.e., a first region 346A which is a region in the one end portion in the axial direction of the tape drive roller 346, a second region 346B which is a region in the other end portion in the axial direction of the tape drive roller 346, and a third region 346C positioned between the first region 346A and the second region 346B are defined in the tape drive roller 346.

As in the above-described embodiment, the first region 346A is configured to oppose the upper end portion of the fabric tape 153. The second region 346B is configured to oppose the lower end portion of the fabric tape 153. The third region 346C is configured to oppose the intermediate portion between the upper end portion and the lower end portion of the fabric tape 153. Further, as in the above-described embodiment, the third region 346C makes contact with the center C in the widthwise direction of the fabric tape 153.

Figure 11C:
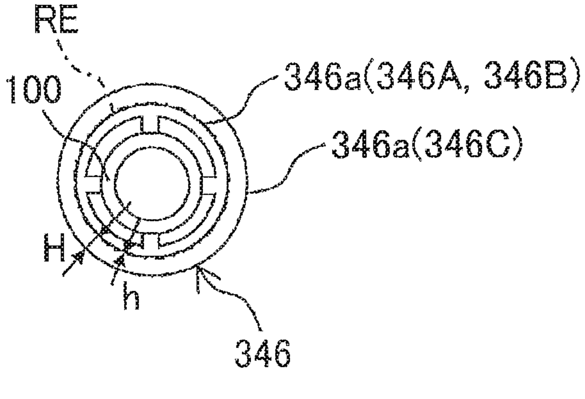
FIG. 11C is atop view illustrating the detailed external configuration of the tape drive roller in the tape cartridge according to the third modification.

Similar to the above-described embodiment, as illustrated in FIG. 11C, the third region 346C provides a length H in the radial direction between the prescribed reference surface RE and the center portion of the roller body 346*a* that is greater than a length h of each of the first region 346A and the second region 346B in the radial direction between the reference surface RE and the corresponding one of the one end portion and the other end portion of the roller body 346*a*. In addition, as in the above-described embodiment, only the third region 346C of the tape drive roller 346 makes contact with the fabric tape 153.

Furthermore, although not illustrated in the drawings, the third region 346C has a diameter in the radial direction (i.e., the thickness direction of the tape) greater than a dimension in the radial direction (i.e., the thickness direction of the tape) of the fabric tape 153. Thus, the first region 346A and the second region 346B do not make contact with the upper end portion and the lower end portion of the fabric tape 153, respectively.

The third modification can exhibit advantageous effects similar to those in the above-described embodiment. Specifically, when the fabric tape 153 is nipped between the tape drive roller 346 and the movable conveying roller 21 in the tape printing device 1, in particular the third region 346C of the tape drive roller 346 makes intense contact with the fabric tape 153, instead of the configuration where the entire portion of the tape drive roller 346 making intense contact with the fabric tape 153 uniformly.

As a limited region of the tape drive roller 346 makes intense contact with the fabric tape 153 in this way, even if the axis of the movable conveying roller 21 in the tape printing device 1 is slightly inclined relative to the surface of the fabric tape 153 because of an assembly error, any pressure variation in the widthwise direction of the nipped fabric tape 153 can be reduced. Consequently, the conveying force for the fabric tape 153 can be prevented from becoming non-uniform and stable conveyance of the fabric tape 153 can be attained, whereby conveyance stoppage (i.e., a jam in the tape printing device) can be suppressed.

<(4) Case where Widthwise Dimension of Protruding Portion Varies in Circumferential Direction>

Figure 12A:
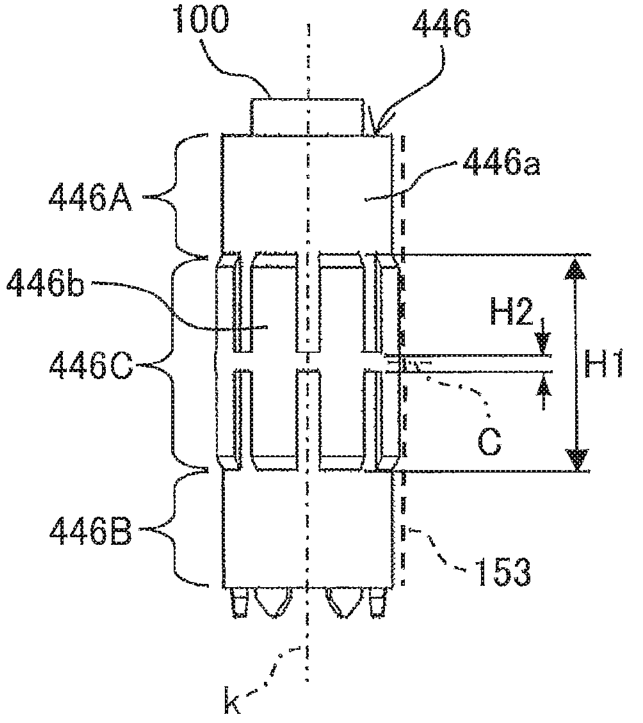
FIG. 12A is a side view illustrating a detailed external configuration of a tape drive roller in a tape cartridge according to a fourth modification to the embodiment in which a dimension in an up-down direction of a protruding portion of the tape drive roller varies in a circumferential direction thereof.
Figure 12B:
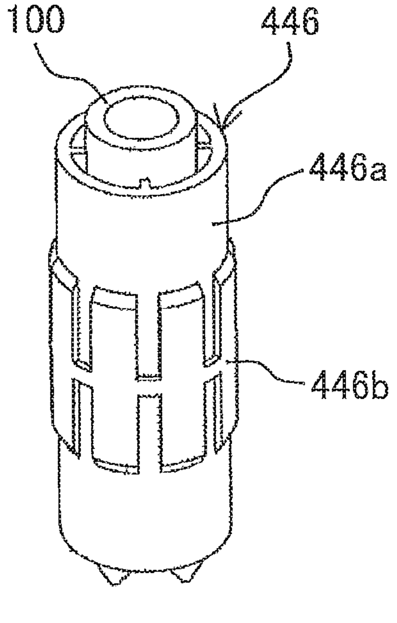
FIG. 12B is a perspective view illustrating the detailed external configuration of the tape drive roller in the tape cartridge according to the fourth modification.

In this fourth modification, a tape drive roller 446 includes a roller body 446*a*, and a protruding portion 446*b* provided on the roller body 446*a* and having such a shape illustrated in FIGS. 12A and 12B. Specifically, the protruding portion 446*b* has a shape in which a dimension in the up-down direction thereof varies between a dimension H1 and a dimension H2 in accordance with a change in the position in a circumferential direction. The dimension H1 is relatively greater than the dimension H2 (i.e., the dimension 112 is relatively smaller than the dimension H1). With this arrangement of the protruding portion 446*b*, three regions, i.e., a first region 446A, a second region 446B and a third region 446C are defined in the tape drive roller 446 similar to the above-described embodiment.

As in the above-described embodiment, the first region 446A is configured to oppose the upper end portion of the fabric tape 153, and the second region 446B is configured to oppose the lower end portion of the fabric tape 153. The third region 446C is a region positioned between the first region 446A and the second region 446B in the up-down direction, and has a dimension in the up-down direction substantially equal to the dimension H1 described above. The third region 446C is configured to oppose the intermediate portion between the upper end portion and the lower end portion of the fabric tape 153. Further, similar to the above-described embodiment, the third region 446C makes contact with the center C in the widthwise direction of the fabric tape 153.

Although not illustrated in the drawings, as in the above-described embodiment, the third region 446C has a length (a maximum length) in the radial direction between the prescribed reference surface RE and the outer peripheral surface of the protruding portion 446*b* that is greater than a length of each of the first region 446A and the second region 446B in the radial direction between the reference surface RE and the outer peripheral surface of the roller body 446*a*. Further, as in the above-described embodiment, only the third region 446C of the tape drive roller 446 makes contact with the fabric tape 153.

That is, although not illustrated in the drawings, the third region 446C provides a distance in the radial direction between the rotation axis k and the outer peripheral surface of the protruding portion 446*b*. Similarly, each of the first region 446A and the second region 446B provides a distance in the radial direction between the rotation axis k and the outer peripheral surface of the roller body 446*a*. The distance in the third region 446C is greater than the distance in each of the first region 446A and the second region 446B.

Furthermore, although not illustrated in the drawings, the third region 446C has a dimension in the radial direction (i.e., the thickness direction of the tape) is greater than a dimension in the radial direction (i.e., the thickness direction of the tape) of the fabric tape 153. In a state where the fabric tape 153 is nipped between the tape drive roller 446 and the movable conveying roller 21, the first region 446A and the second region 446B do not make contact with the fabric tape 153, and the upper end portion and the lower end portion of the fabric tape 153 do not make contact with any portion of the drive roller 446.

The protruding portion 446*b* is not limited to a configuration described above where the dimension in the up-down direction of the protruding portion 446*b* varies between the two dimensions in accordance with the position in the circumferential direction. For example, the dimension in the up-down direction of the protruding portion 446*b* may vary among three or more dimensions. Alternatively, the dimension in the up-down direction of the protruding portion 446*b* may vary smoothly in accordance with the position in the circumferential direction, instead of varying stepwisely.

In addition, the dimension in the up-down direction of the protruding portion 446*b* is not limited to vary periodically (or regularly) in accordance with the change in the position in the circumferential direction, and the dimension may vary irregularly.

The fourth modification can also exhibit advantageous effects similar to those in the above-described embodiment.

<(5) Case where Fixed Member is Used as Nipping Member>

In this fifth modification, in place of the tape drive roller such as those in the embodiment and the first to fourth modifications described above, a tape nipping plate 546 fixed to the cartridge casing 31 is employed as a nipping member in a tape cartridge 530, as illustrated in FIGS. 13A to 15D. The tape nipping plate 546 includes a curved surface portion 546*a*, a flat surface portion 546*b*, and a hook portion 546*c*. The curved surface portion 546*a* has a concave surface 546*i* on the front side and a convex surface 546*o* on the rear side. The flat surface portion 546*b* is provided on the concave surface 546*i*, and the hook portion 546*c* is provided on the convex surface 546*o*.

In the fifth modification, the tape nipping plate 546 is provided with the only one flat surface portion 546*b* disposed at a center portion in the up-down direction of the concave surface 546*i*. Accordingly, three regions including a first region 546A, a second region 546B, and a third region 546C are defined in the tape nipping plate 546.

Figure 13B:
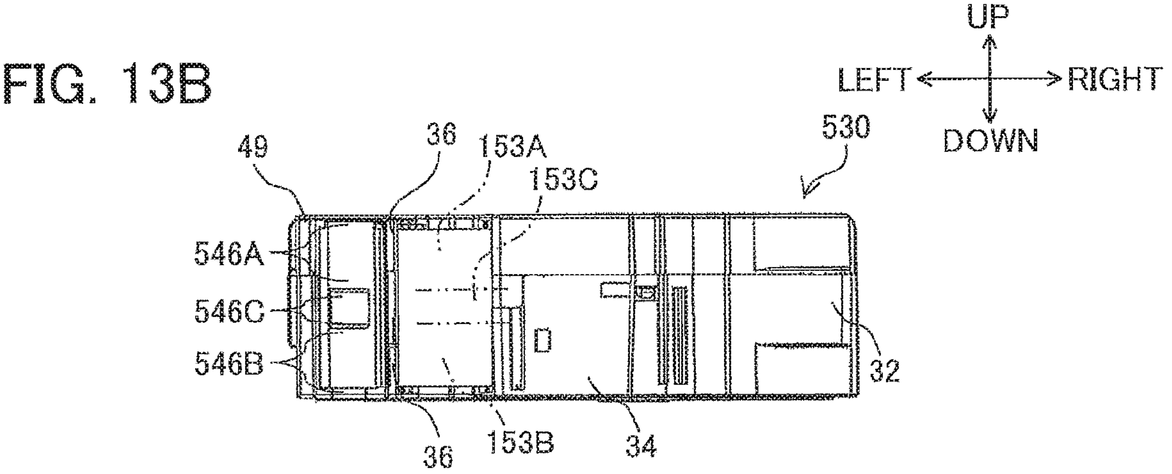
FIG. 13B is a side view illustrating the detailed external configuration of the tape cartridge according to the fifth modification.
Figure 13C:
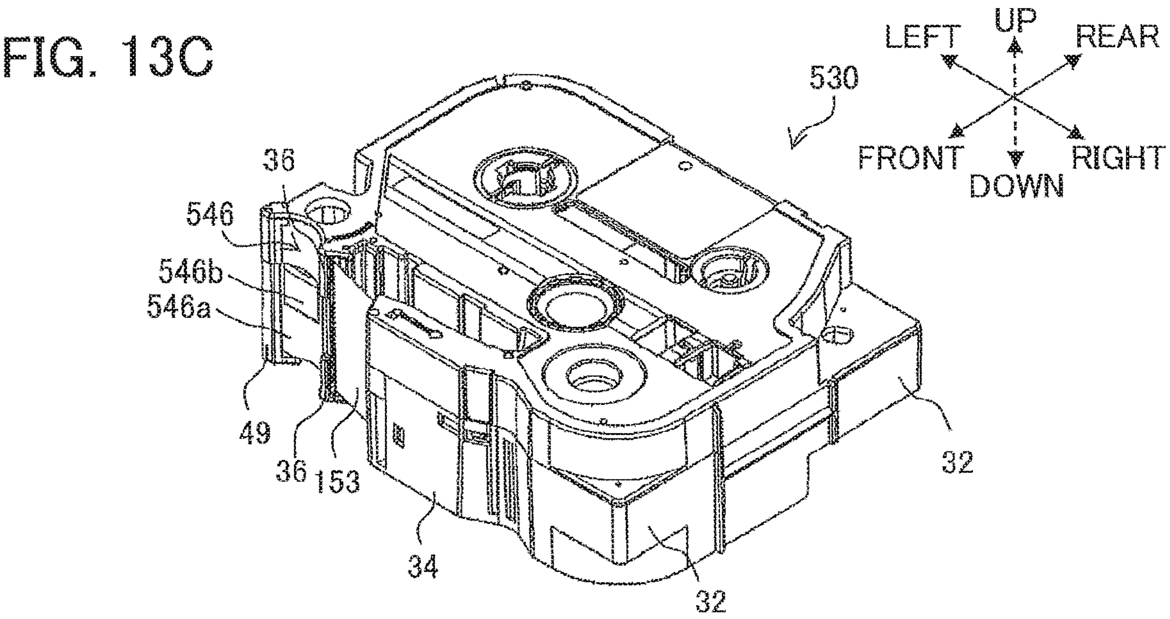
FIG. 13C is a perspective view illustrating the detailed external configuration of the tape cartridge according to the fifth modification as viewed from the front-right side thereof.

As illustrated in FIG. 13B, the first region 546A is configured to oppose the upper end portion 153A of the fabric tape 153, and the second region 546B is configured to oppose the lower end portion 153B of the fabric tape 153. The third region 546C is a region provided between the first region 546A and the second region 546B in the up-down direction, and is configured to oppose the center portion 153C between the upper end portion 153A and the lower end portion 153B of the fabric tape 153.

Figure 15A:
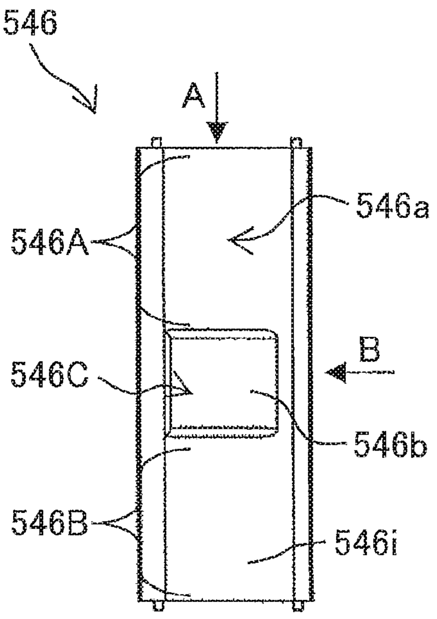
FIG. 15A is an explanatory view for explaining a detailed configuration of the tape nipping plate in the tape cartridge according to the fifth modification.
Figure 15B:
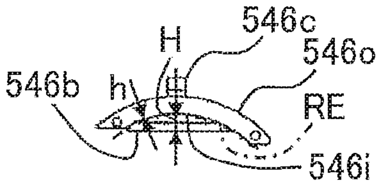
FIG. 15B is a view illustrating the tape nipping plate in the tape cartridge according to the fifth modification as viewed from a direction indicated by an arrow A in FIG. 15A.
Figure 15C:
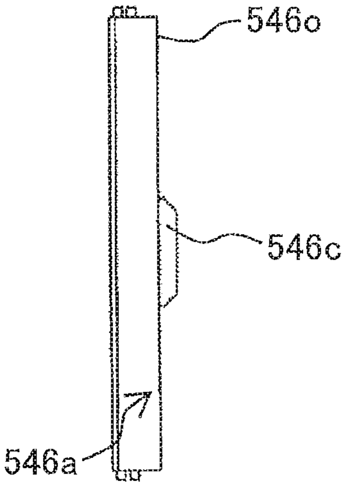
FIG. 15C is a view illustrating the tape nipping plate in the tape cartridge according to the fifth modification as viewed from a direction indicated by an arrow B in FIG. 15A.
Figure 15D:
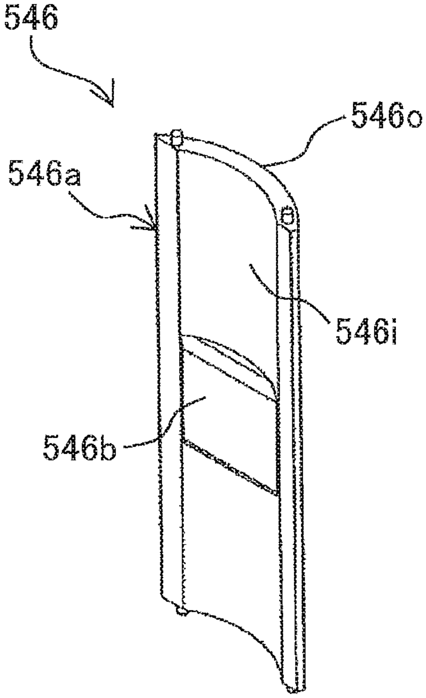
FIG. 15D is a perspective view illustrating the detailed configuration of the tape nipping plate in the tape cartridge according to the fifth modification.
Figure 16A:
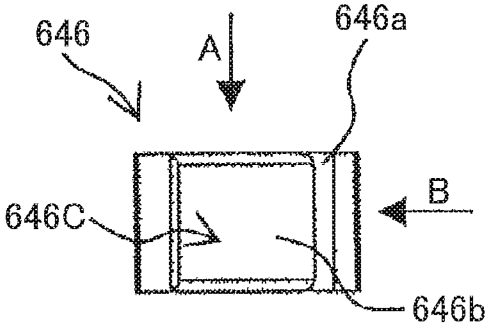
FIG. 16A is an explanatory view for explaining a detailed configuration of a tape nipping plate of a tape cartridge according to a sixth modification to the embodiment in which a first region and a second region are omitted from the tape nipping plate according to the fifth modification.
Figure 16B:
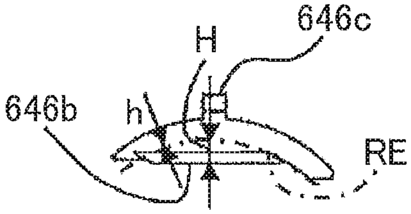
FIG. 16B is a view illustrating the tape nipping plate of the tape cartridge according to the sixth modification as viewed from a direction indicated by an arrow A in FIG. 16A.
Figure 16C:
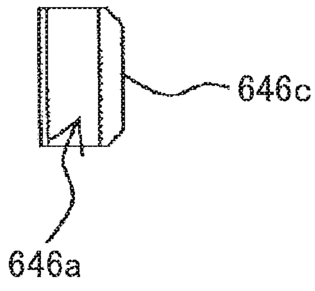
FIG. 16C is a view illustrating the tape nipping plate of the tape cartridge according to the sixth modification as viewed from a direction indicated by an arrow B in FIG. 16A.
Figure 16D:
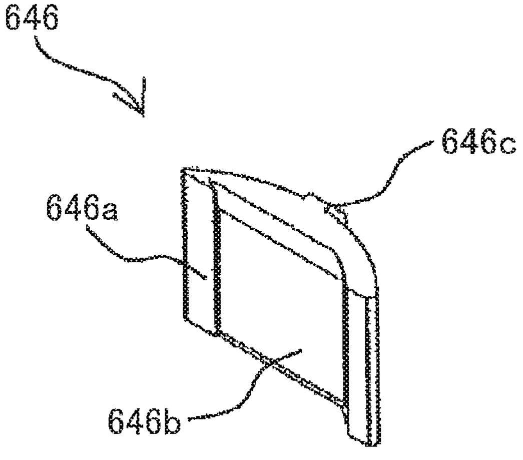
FIG. 16D is a perspective view illustrating the detailed configuration of the tape nipping plate of the tape cartridge according to the sixth modification.

Owing to the configuration where the flat surface portion 546*b* protrudes from the concave surface 546*i* of the curved surface portion 546*a* of the tape nipping plate 546, the third region 546C provides a length H in the radial direction between the prescribed reference surface RE and the flat surface portion 546*b*. The length H is greater than a length h in each of the first region 546A and the second region 546B in the radial direction between the reference surface RE and the concave surface 546*i*, as illustrated in FIG. 15B. Since the concave surface 546*i* serves as the reference surface RE in the fifth modification, the length h described above is approximately equal to zero. That is, the third region 546C protrudes further outward than the first region 546A and the second region 546B.

Figure 14:
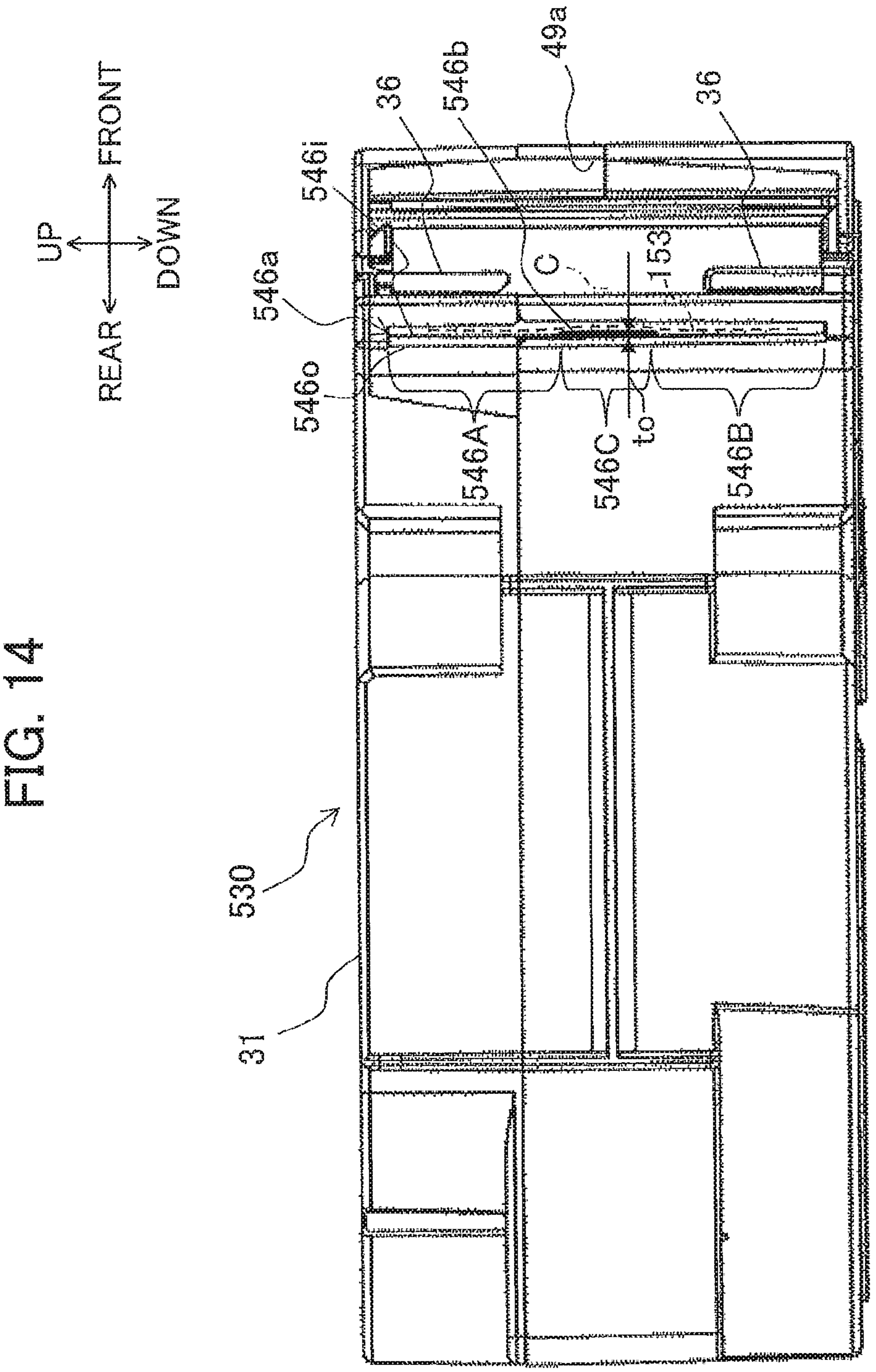
FIG. 14 is a side view of the tape cartridge according to the fifth modification as viewed from a direction indicated by an arrow D in FIG. 13A.

In addition, the above-described configuration in which the third region 546C (i.e., the flat surface portion 546*b*) projects from the concave surface 546*i* allows only the third region 546C of the tape nipping plate 546 to make contact with the fabric tape 153 as illustrated in FIG. 14. In particular, the third region 546C makes contact with at least the center C in the up-down direction (i.e., the widthwise direction of the tape) of the fabric tape 153. Furthermore, as illustrated in FIG. 14, the third region 546C (i.e., the flat surface portion 546*b*) has a dimension to in the thickness direction of the tape greater than a dimension (not illustrated) in the thickness direction of the fabric tape 153. The first region 546A and the second region 546B do not make contact with the upper end portion 153A and the lower end portion 153B of the fabric tape 153, respectively.

Advantageous Effects in Fifth Modification

The fifth modification can attain advantageous effects similar to those in the above-described embodiment. Specifically, according to the third modification, in the tape nipping plate 546 serving as an example of the nipping member, the length H in the radial direction of the third region 546C from the reference surface RE is greater than the length h in the radial direction of the first region 546A and the second region 546B from the reference surface RE as described above. Thus, when the fabric tape 153 is nipped between the tape nipping plate 546 and the movable conveying roller 21 in the tape printing device 1, the third region 546C in particular of the tape nipping plate 546 makes intense contact with the fabric tape 153, instead of the entire portion of the tape nipping plate 546 making intense contact with the fabric tape 153 uniformly.

In this way, as a limited region of the tape nipping plate 546 makes intense contact with the fabric tape 153, even if the axis of the movable conveying roller 21 in the tape printing device 1 is slightly inclined relative to the surface of the fabric tape 153 because of an assembly error, a pressure variation that could be produced on the nipped fabric tape 153 in the widthwise direction of can be reduced. Consequently, the conveying force can be restricted from becoming non-uniform and the fabric tape 153 can be conveyed stably, whereby a conveyance stoppage (i.e., a jam in the tape printing device) can be prevented.

In the fifth modification, in particular, the dimension to in the radial direction of the third region 546C of the tape nipping plate 546 is greater than the dimension of the fabric tape 153 in the radial direction. This makes it more difficult for the fabric tape 153 to make contact with a portion of the tape nipping plate 546 other than the third region 546C, i.e., the first region 546A and the second region 546B.

In this fifth modification, in particular, when the fabric tape 153 is nipped between the tape nipping plate 546 and the movable conveying roller 21 of the tape printing device 1, only the third region 546C makes contact with the fabric tape 153, instead of the configuration where the entire portion of the tape nipping plate 546 makes contact with the fabric tape 153. In this manner, as a limited region of the tape nipping plate 546 makes contact with the fabric tape 153, the pressure variation described above can be reduced, and the conveying force can be restricted from being applied to the fabric tape 153 ununiformly. Thus, the occurrence of a conveyance stoppage can be prevented.

In this fifth modification, particularly, the upper end portion 153A and the lower end portion 1531 of the fabric tape 153 do not make contact with the first region 546A and the second region 546B of the tape nipping plate 546, respectively, and only the center portion 153C between the upper end portion 153A and the lower end portion 153B makes contact with the third region 546C of the tape nipping plate 546. Thus, as only the third region 546C of the tape nipping plate 546 in the tape cartridge 530 makes contact with the fabric tape 153, any pressure variation that could be produced on the fabric tape 153 in the widthwise direction thereof can be reduced.

Further, in this fifth modification, particularly, the third region 546C of the tape nipping plate 546 makes contact with at least the center C in the widthwise direction of the fabric tape 153 (see FIG. 14). Since the third region 546C of the tape nipping plate 546 makes contact with a region of the fabric tape 153 including the center C in the widthwise direction thereof in this way, a pressure variation that could be produced on the fabric tape 153 in the widthwise direction thereof can be reduced.

Particularly in this fifth modification, the tape nipping plate 546 fixed to the cartridge casing 31 is provided to serve as an example of the nipping member. This configuration enables the conveyed fabric tape 153 to be stably nipped between the tape nipping plate 546 and the movable conveying roller 21.

In this fifth modification, in particular, the tape nipping plate 546 is provided between the tape discharge opening 49*a* and the insertion recess portion DB. Accordingly, the tape nipping plate 546 and the movable conveying roller 21 can reliably nip and convey the fabric tape 153 when the fabric tape 153 accommodated within the cartridge casing 31 is conveyed through the conveyance path along the insertion recess portion DB, the tape nipping plate 546, and the tape discharge opening 49*a* in this order.

<(6) Case where First Region and Second Region of Fixed Member are Omitted>

A sixth modification to the embodiment will be described next. In this sixth modification, as illustrated in FIGS. 16A to 16D, provided is a tape nipping plate 646 in which the first region 546A and the second region 546B are omitted from the tape nipping plate 546 depicted in the above fifth modification. That is, only a third region 646C is defined in the tape nipping plate 646. Consequently, the tape nipping plate 646 in the sixth modification does not make contact with either of the upper end portion 153A and the lower end portion 153B of the fabric tape 153 but makes contact with only the center portion 153C. The tape nipping plate 646 includes a curved surface portion 646*a*, a flat surface portion 646*b*, and a hook portion 646*c*.

According to the sixth modification, when the fabric tape 153 is nipped between the tape nipping plate 646 and the movable conveying roller 21 of the tape printing device 1, the tape nipping plate 646 does not make contact with the entire portion of the fabric tape 153 but makes contact with only the center portion 153C of the fabric tape 153 that is a portion of the fabric tape 153 other than the upper end portion 153A and the lower end portion 153B.

Since a limited region of the fabric tape 153 makes contact with the tape nipping plate 646 in this way, even if the axis of the movable conveying roller 21 is slightly inclined relative to the surface of the fabric tape 153 because of an assembly error, any pressure variation that could be produced on the nipped fabric tape 153 in the widthwise direction thereof can be suppressed as described above. Consequently, the force for conveying the fabric tape 153 can be prevented from becoming non-uniform to attain the stable conveyance of the fabric tape 153, thereby restraining the occurrence of a conveyance stoppage (i.e., a jam in the tape printing device).

<(7) Case where Stencil Paper is Used>

Next, a seventh modification to the embodiment will be described. In the above-described embodiment and the first to sixth modifications, the fabric tape 153 is used as a tape on which an image is to be printed and to be conveyed, but the present disclosure is not limited to this. For example, a stencil paper tape constituted by well-known heat-sensitive stencil paper may be used as the tape.

Figure 17:
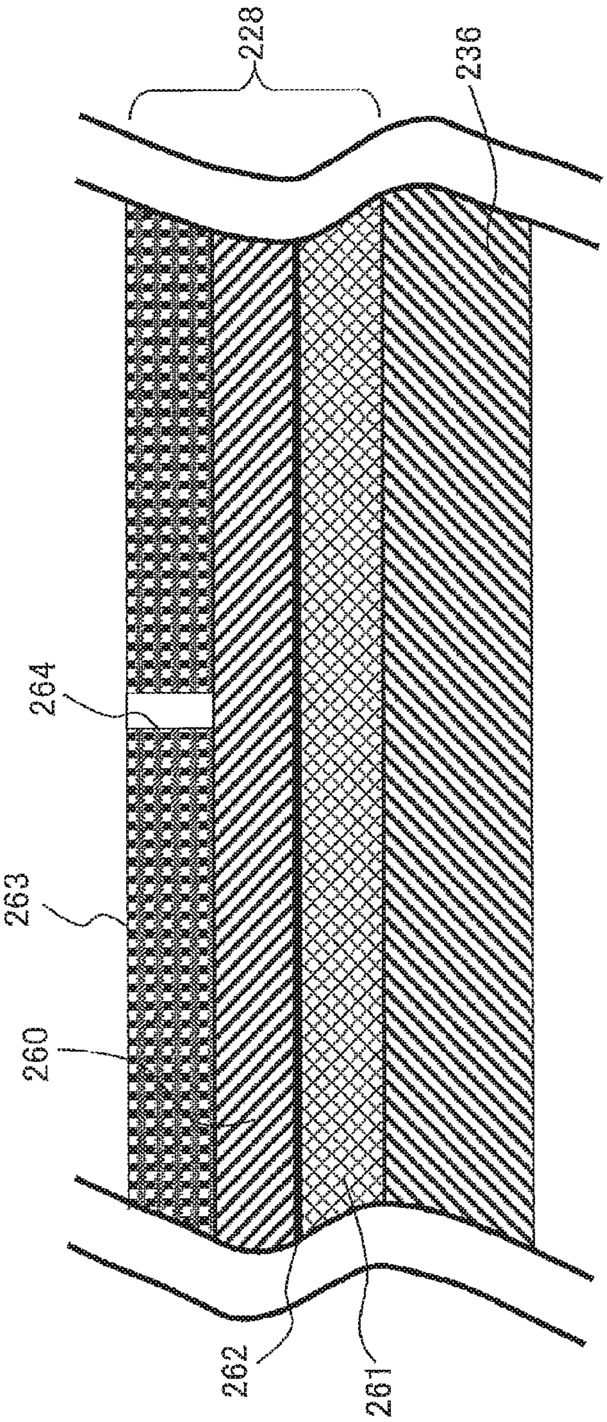
FIG. 17 is an explanatory view for explaining a layer configuration of a stencil paper tape in a tape cartridge according to a seventh modification.

In this seventh modification, as illustrated in FIG. 17, a stencil paper tape 228 is constituted by a thermoplastic film 260, a porous support member 261, a bonding layer 262 bonding the thermoplastic film 260 and the porous support member 261, and a surface treatment layer 263 provided on an outer surface of the thermoplastic film 260. In the seventh modification, in a state where the stencil paper tape 228 is accommodated within the cartridge casing 31, the stencil paper tape 228 is wound about the tape spool 40 in the tape roll 206 while the porous support member 261 faces outward so that the surface treatment layer 263 provided on the thermoplastic film 260 makes contact with the thermal head 10.

The thermoplastic film 260 consists, for example, of a film having a thickness of 1 to 4 μm and made of a thermoplastic synthetic resin (e.g., polyethylene terephthalate, polypropylene, vinylidene chloride-vinyl chloride copolymer). The porous support member 261 is formed of porous thin paper having a thickness of approximately 20 to 100 μm and containing, as a main source material, a natural fiber (e.g., Manila hemp, paper mulberry, Oriental paperbush), a synthetic fiber (e.g., polyethylene terephthalate, polyvinyl alcohol, polyacrylonitrile), or a semisynthetic fiber (e.g., rayon).

The surface treatment layer 263 is formed of a material having a low coefficient of friction such as a silicone resin. A protection tape 236 wound about a separate tape spool (not illustrated) and conveyed along with the stencil paper tape 228 is formed of a synthetic resin material such as polypropylene or vinylidene chloride, or natural paper that is thicker or firmer than the stencil paper tape 228.

When a printing process is performed, the stencil paper tape 228 is conveyed as described above, and a desired dot portion of the thermal head 10 is heated. As a result, a hole 264 corresponding to the dot is formed in the surface treatment layer 263 and the thermoplastic film 260 of the stencil paper tape 228. Even in a case where the stencil paper tape 228 is used as the tape in this way, advantageous effects identical to those described above can be obtained.

Other than the fabric tape 153 and the stencil paper tape 228 described above, any appropriate printable material such as a film, PET and paper and the like may be used as a tape.

<Remarks>

Note that terms such as "perpendicular," "parallel," and "flat" used in the above description are not to be construed in their strict senses. In other words, a design or manufacture tolerance or error in the components is permitted, and the terms "perpendicular," "parallel," and "flat" denote "substantially perpendicular," "substantially parallel," and "substantially flat", respectively.

Further, when terms such as "identical," "equal," and "different" are used in terms of the dimension or the size of the external appearance in the above description, such the term are not to be construed in their strict senses. In other words, a design or manufacture tolerance or error in the components is permitted, and these terms "identical," "equal," and "different" denote "substantially identical," "substantially equal," and "substantially different", respectively.

Other than those described above, the techniques in the above-described embodiment and modifications may be combined as appropriate.

Further, although detailed examples are not described, the present disclosure can be implemented with various modifications without departing from the scope of the present disclosure.

The tape cartridges 30 and 530 are an example of a tape cassette. The fabric tape 153 and the stencil paper tape 228 are an example of a tape. The upper end portion 153A is an example of one end portion in the first direction of the tape. The lower end portion 153B is an example of another end portion in the first direction of the tape. The center C is an example of a center portion. The tape roll 206 is an example of a tape roll. The cartridge casing 31 is an example of a case. The tape drive rollers 46, 146, 246, 346 and 446, and tape nipping plate 546 and 646 are an example of a nipping member. The first regions 46A, 146A, 246A, 346A, 446A and 546A are an example of a first region. The second regions 46B, 146B, 246B, 346B, 446B and 546B are an example of a second region. The third regions 46C, 146C, 246C, 346C, 446C, 546C and 646C are an example of a third region. The reference surface RE is an example of an imaginary reference surface. A length h is examples of a first length and a second length. A length H is an example of a third length. The up-down direction is an example of a first direction. The left-right direction is an example of a second direction. The radial direction of the tape drive roller 46 is an example of a third direction. The tape printing device 1 is an example of a printing device. The movable conveying roller 21 is an example of a conveying roller. The cartridge attachment portion 8 is an example of a cassette holder. The dimension H1 is an example of a first dimension. The dimension H2 is an example of a second dimension. The diameter Da is an example of a first diameter. The diameter db is an example of a second diameter. The diameter Dc is an example of a third diameter. The tape nipping plate 546 and 646 are also an example of a fixed member. The tape discharge opening 49*a* is an example of a discharge opening. The insertion recess portion DB is an example of an opening. The pair of regulating members 36 is an example of a guide member.

What is claimed is:

1. A tape cassette for use with a printing device, the printing device comprising a conveying roller and a cassette holder to which the tape cassette is attachable, the tape cassette comprising:

- a tape roll which is a roll of a tape wound about an axis extending in a first direction, the tape having one end portion and another end portion in the first direction, the tape being configured to be conveyed by the conveying roller;
- a case accommodating the tape roll therein; and
- a nipping member provided in the case, the nipping member being configured to nip the tape drawn out from the tape roll and to convey the tape in a second direction in cooperation with the conveying roller in a state where the tape cassette is attached to the cassette holder, the second direction being perpendicular to the first direction, the nipping member comprising:

- a first region configured to face the one end portion in the first direction of the tape, the first region protruding a first length in a third direction from an outer surface of the nipping member, the third direction being perpendicular to both the first direction and the second direction;
- a second region configured to face the another end portion in the first direction of the tape, the second region protruding a second length in the third direction from the outer surface of the nipping member; and
- a third region positioned between the first region and the second region in the first direction, the third region protruding a third length in the third direction from the outer surface of the nipping member, wherein the third region has a dimension in the first direction that is smaller than both a dimension in the first direction of the first region and a dimension in the first direction of the second region, wherein the nipping member is a roller, the roller comprising:

- a roller body having a hollow cylindrical shape extending in the first direction, the roller body being rotatably supported by the case, the roller body having the first region and the second region; and
- only one protruding portion which is the third region, the protruding portion being provided at an outer peripheral surface of the roller body and provided integrally with the roller body, wherein the third length is greater than both the first length and the second length, wherein only the third region is configured to make contact with the tape such that the first region and the second region do not make contact with the tape, wherein the third region is configured to maintain contact with a center in the first direction of the tape during conveyance of the tape, wherein the third region has a dimension in the third direction greater than a thickness in the third direction of the tape, wherein the protruding portion is provided at a center portion in the first direction of the roller body, wherein the tape is made of fabric, wherein the conveying roller faces the protruding portion in a facing direction in the state where the tape cassette is attached to the cassette holder, wherein the tape has a part configured to be nipped by the protruding portion and the conveying roller, the part having a yarn extending in the second direction, and wherein one end edge in the first direction of the protruding portion and another end edge in the first direction of the protruding portion extend in the second direction as viewed in the facing direction.

2. The tape cassette according to claim 1, wherein the one end portion and the another end portion in the first direction of the tape do not make contact with the first region and the second region, respectively.

3. The tape cassette according to claim 1, wherein the third region is configured to make contact with at least a center portion in the first direction of the tape.

4. The tape cassette according to claim 1, wherein the third region is configured not to make contact with a center portion in the first direction of the tape.

5. The tape cassette according to claim 1, wherein the third region includes a plurality of third regions.

6. The tape cassette according to claim 1, the roller body has a cylindrical shape centered on a rotational axis, and wherein the third region has a dimension in the first direction including a first dimension and a second dimension smaller than the first dimension, the third region being provided on the outer peripheral surface and having a shape in which the dimension in the first direction varies between the first dimension and the second dimension in accordance with a change in position in a circumferential direction.

7. The tape cassette according to claim 1, wherein the roller body has:

one end portion in the first direction, the one end portion having a first diameter;

another end portion in the first direction, the another end portion having a second diameter; and a center portion in the first direction, the center portion having a third diameter, and wherein the roller body has a barrel-like shape in which both the first diameter and the second diameter are smaller than the third diameter.

8. The tape cassette according to claim 1, wherein the nipping member is a fixed member immovably fixed to the case.

9. The tape cassette according to claim 1, wherein the case is formed with:

a discharge opening formed in a downstream end of a conveying path of the tape and allowing the tape conveyed along the conveying path to be discharged an outside of the case therethrough; and an opening positioned upstream of the discharge opening in the conveying path and allowing the tape conveyed along the conveying path to be exposed to the outside, and wherein the nipping member is disposed at a position between the discharge opening and the opening.

10. The tape cassette according to claim 9, further comprising a guide member allowing the tape to pass therethrough to guide the tape, the guide member having an end portion facing the tape passing therethrough, wherein the guide member is disposed such that the end portion does not interfere with the third region.

11. The tape cassette according to claim 1, wherein the nipping member is configured to nip the tape in cooperation with the conveying roller cantilevered by a drive shaft.

* * * * *